(12) United States Patent
Larose et al.

(10) Patent No.: US 11,911,907 B2
(45) Date of Patent: Feb. 27, 2024

(54) SYSTEM AND METHOD FOR OPERATING MAGNETORHEOLOGICAL FLUID CLUTCH APPARATUS

(71) Applicant: EXONETIK INC., Sherbrooke (CA)

(72) Inventors: Pascal Larose, Sherbrooke (CA); Patrick Chouinard, Sherbrooke (CA); Jean-Sebastien Plante, Sherbrooke (CA); Guifre Julio, Westbury (CA)

(73) Assignee: EXONETIK INC., Sherbrooke (CA)

( * ) Notice: Subject to any disclaimer, the term of this patent is extended or adjusted under 35 U.S.C. 154(b) by 666 days.

(21) Appl. No.: 17/047,090

(22) PCT Filed: Apr. 23, 2019

(86) PCT No.: PCT/CA2019/050505
§ 371 (c)(1),
(2) Date: Oct. 13, 2020

(87) PCT Pub. No.: WO2019/204917
PCT Pub. Date: Oct. 31, 2019

(65) Prior Publication Data
US 2021/0138645 A1 May 13, 2021

Related U.S. Application Data

(60) Provisional application No. 62/661,352, filed on Apr. 23, 2018.

(51) Int. Cl.
*B25J 9/16* (2006.01)
*F16D 37/02* (2006.01)
(Continued)

(52) U.S. Cl.
CPC ........... *B25J 9/1664* (2013.01); *B25J 9/1641* (2013.01); *F16D 37/02* (2013.01); *B60G 17/015* (2013.01); *F16D 2037/001* (2013.01)

(58) Field of Classification Search
CPC ........................ F16D 37/02; F16D 2037/001
See application file for complete search history.

(56) References Cited

U.S. PATENT DOCUMENTS

| | | | |
|---|---|---|---|
| 8,409,053 | B2 | 4/2013 | Samie et al. |
| 10,012,273 | B2 | 7/2018 | Plante et al. |

(Continued)

FOREIGN PATENT DOCUMENTS

| | | | |
|---|---|---|---|
| WO | 2016134472 A1 | 9/2016 | |
| WO | 2016187719 A1 | 12/2016 | |

(Continued)

*Primary Examiner* — David R Morris
(74) *Attorney, Agent, or Firm* — NORTON ROSE FULBRIGHT CANADA LLP

(57) ABSTRACT

A control system for controlling movements of an end effector connected to a clutch output of magnetorheological (MR) fluid clutch apparatuses. A clutch driver drives the MR fluid clutch apparatuses between a controlled slippage mode, in which slippage in the MR fluid clutch apparatuses varies, and a combined mode, in which slippage between clutch input and clutch output is maintained below a given threshold simultaneously for both of the MR fluid clutch apparatuses, the two clutch outputs resisting movement of the end effector in the same direction. A mode selector module receives signals representative of a movement parameter(s) of the end effector, to select and switch a mode based on the signals. A movement controller controls the clutch driver and the motor driver to displace the end effector based on the selected mode and on commanded movements of the end effector for the end effector to achieve the commanded movements.

20 Claims, 26 Drawing Sheets

(51) Int. Cl.
*B60G 17/015* (2006.01)
*F16D 37/00* (2006.01)

(56) References Cited

U.S. PATENT DOCUMENTS

| | | |
|---|---|---|
| 10,746,235 B2 | 8/2020 | Denninger et al. |
| 10,780,943 B2 | 9/2020 | Denninger et al. |
| 2011/0045932 A1* | 2/2011 | Fauteux .................. B25J 9/102 |
| | | 475/221 |
| 2018/0029225 A1 | 2/2018 | Plante et al. |
| 2018/0072189 A1 | 3/2018 | Plante et al. |
| 2018/0214730 A1 | 8/2018 | Larose et al. |

FOREIGN PATENT DOCUMENTS

| | | |
|---|---|---|
| WO | 2017015763 A1 | 2/2017 |
| WO | 2017185176 A1 | 11/2017 |

\* cited by examiner

SYSTEM AND METHOD FOR OPERATING MAGNETORHEOLOGICAL FLUID CLUTCH APPARATUS

CROSS-REFERENCE TO RELATED APPLICATION

The present application claims the priority of U.S. Patent Application No. 62/661,352, filed on Apr. 23, 2018 and incorporated herein by reference.

FIELD OF THE APPLICATION

The present application relates generally to magnetorheological (MR) fluid clutch apparatuses, and more particularly, to antagonist systems using such apparatuses.

BACKGROUND OF THE ART

State-of-the-art distributed power devices rely on hydraulics or electromagnetic actuation. Hydraulic actuation is reliable towards mechanical jam, but has fundamentally limited dynamic response and efficiency. Furthermore, implementation of hydraulic systems into commercial applications may be problematic as hydraulics are prone to leakage, leading to increased maintenance costs. Moreover, hydraulic actuation is hardware intensive.

Electromagnetic actuation offers a clean alternative to hydraulic actuation. For high dynamic applications, the most common form of electromechanical actuation is found in direct-drive motors, which are prohibitively heavy. Device weight can be considerably reduced by providing a reduction ratio between the motor and the end-effector. Indeed, when coupled to reduction gearboxes, electromechanical actuators may be lighter and less expensive than direct drive solutions, but their high output inertia, friction and backlash may diminish their dynamic performance.

MR fluid clutch apparatuses are known as useful apparatuses for transmitting motion from a drive shaft with precision and accuracy, among other advantages, which could enhance the performance of electromechanical actuation systems. MR fluid is known to permanently change properties over time. These changes may include, non-exhaustively, a change in viscosity, a change in the ability to transmit a shear stress in function of the magnetic flux density in the MR fluid, and a change of magnetic permeability. One factor contributing to the change of properties is the energy dissipated in the fluid when the fluid is solicited in a shear situation. A shear situation of the fluid occurs when torque is transmitted by the MR fluid clutch apparatus while an angular speed difference is present between the input and the output of the MR fluid clutch apparatus. In this condition, the apparent yield shear stress of the MR fluid in the interface between the input and the output of the MR fluid clutch apparatus controls the torque transmitted from the input of the MR fluid clutch apparatus to its output. In such a shear situation, the MR fluid absorbs energy that may be proportional to the speed difference and the torque transmitted from the input to the output. The higher the transmitted torque of the MR fluid clutch apparatus and the higher the angular speed between the input rotor and the output rotor, the more energy may be dissipated in the MR fluid and the greater the properties of the MR fluid may change over time.

SUMMARY OF THE APPLICATION

In accordance with an embodiment of the present disclosure, there is provided a control system for controlling movements of an end effector connected to a clutch output of at least two magnetorheological (MR) fluid clutch apparatus, the control system comprising: a clutch driver configured to drive the at least two MR fluid clutch apparatuses between at least a controlled slippage mode, in which slippage between a clutch input and the clutch output of the MR fluid clutch apparatuses varies, and a combined mode, in which said slippage between the clutch input and the clutch output is maintained below a given threshold simultaneously for both of the MR fluid clutch apparatuses, the two clutch outputs resisting movement of the end effector in the same direction; a motor driver configured to control a motor output of at least one motor, the motor output coupled to at least one clutch input; a mode selector module configured to receive signals representative of at least one movement parameter of the end effector, the mode selector module selecting a mode between at least the controlled slippage mode and the combined mode of the clutch driver based on the signals, and switching the selected mode based on the signals; and a movement controller to control the clutch driver and the motor driver to displace the end effector based on at least one of the selected mode and on commanded movements of the end effector for the end effector to achieve the commanded movements.

Further in accordance with the embodiment, for instance, the mode selector module receives data on the commanded movements and selects the mode according to the commanded movements and on the at least one movement parameter.

Still further in accordance with the embodiment, for instance, the clutch driver supplies current to the at least one MR fluid clutch apparatus to reduce the slippage.

Still further in accordance with the embodiment, for instance, the clutch driver supplies current to the at least one MR fluid clutch apparatus to increase the slippage.

Still further in accordance with the embodiment, for instance, the motor driver is configured to a vary an intensity of a motor output of the at least one motor, and wherein the movement controller determines the intensity of the motor output in the combined mode.

Still further in accordance with the embodiment, for instance, the mode selector module receives signals indicative of a manual contact with the end effector, and selects the controlled slippage mode throughout the manual contact.

Still further in accordance with the embodiment, for instance, the mode selector module receives signals indicative of a position of the end effector in a working envelope thereof, and selects the mode based on the position.

Still further in accordance with the embodiment, for instance, the mode selector module determines that the position of the end effector is in a high controllability portion of the working envelope and selects the controlled slippage mode for the high controllability portion.

Still further in accordance with the embodiment, for instance, the mode selector module determines that the position of the end effector is in a portion of the working envelope that requires higher dissipative force and selects the combined mode for the working envelope.

Still further in accordance with the embodiment, for instance, the mode selector module receives signals indicative of at least one of a speed and acceleration of the end effector, the mode selector module selecting the combined mode when the speed and/or acceleration is beyond a programmed threshold.

Still further in accordance with the embodiment, for instance, the mode selector module determines from the commanded movements a change of direction of the end effector, the mode selector module selecting the combined mode for the change of direction of the end effector.

Still further in accordance with the embodiment, for instance, the clutch driver is configured to drive at least one of the at least two MR fluid clutch apparatuses in a lock mode, in which said slippage between the clutch input and the clutch output is maintained below a given threshold, and wherein the mode selector module selects a mode between the controlled slippage mode, the combined mode and the lock mode of the clutch driver.

Still further in accordance with the embodiment, for instance, the mode selector module selects and maintains the lock mode for 75%-98% of an operation of the end effector.

In accordance with another embodiment of the present disclosure, there is provided an assembly of a control system and MR fluid actuator unit controlling movements of an end effector, the assembly comprising: the control system as described above, at least one MR fluid actuator unit including the at least two MR fluid clutch apparatuses and at least one motor, the at least two MR fluid clutch apparatuses each having a clutch output transmitting movement to the end effector, and having a clutch input coupled to an output of at least one motor.

In accordance with another embodiment of the present disclosure, there is provided a system for controlling movements of an end effector connected to at least two magnetorheological (MR) fluid clutch apparatuses, the system comprising: at least one processing unit; and a non-transitory computer-readable memory communicatively coupled to the processing unit and comprising computer-readable program instructions executable by the processing unit for: continuously monitoring at least one movement parameter of the end effector; selecting a mode of operation of the MR fluid clutch apparatus based on at least one movement parameter and a commanded movement; driving a motor output of at least one motor selectively coupled to the MR fluid clutch apparatuses, while varying the slippage of the MR fluid clutch apparatuses to cause a displacement of the end effector in a commanded movement in a controlled slippage mode, and alternatively, maintaining the slippage of at least two of the MR fluid clutch apparatuses below a given threshold simultaneously, clutch outputs of the at least two of the MR fluid clutch apparatuses resisting movement of the end effector in the same direction, in a combined mode.

Further in accordance with the embodiment, for instance, maintaining the slippage causes a shunting of at least one output of a mechanical system. Still further in accordance with the embodiment, for instance, driving the motor output in the combined mode comprises shutting down the motor output.

Still further in accordance with the embodiment, for instance, varying the slippage of the MR fluid clutch apparatuses includes supplying current to at least one of the MR fluid clutch apparatuses to reduce the slippage.

Still further in accordance with the embodiment, for instance, varying the slippage of the MR fluid clutch apparatuses includes supplying current to at least one of the MR fluid clutch apparatuses to increase the slippage.

Still further in accordance with the embodiment, for instance, a slippage of the MR fluid clutch apparatus is kept below a given threshold to cause a displacement of the end effector in the commanded movement in a lock mode.

Still further in accordance with the embodiment, for instance, driving the motor output in the lock mode comprises varying an intensity of the motor output based on at least one movement parameter and the commanded movement.

Still further in accordance with the embodiment, for instance, at least one of the MR fluid clutch apparatuses is of partially closed type.

Still further in accordance with the embodiment, for instance, a default mode is provided where energy is dissipated by at least two of the MR fluid clutch apparatuses.

In accordance with another embodiment of the present disclosure, there is provided a control system for controlling movements of an end effector connected to a clutch output of a magnetorheological (MR) fluid clutch apparatus, the control system comprising: a clutch driver configured to drive the MR fluid clutch apparatus between at least a transmission mode, in which the MR fluid clutch apparatus transmits torque from a clutch input to the clutch output, and a bypass mode, in which slippage between the clutch input and the clutch output is maintained above a given threshold for the MR fluid clutch apparatus; a motor driver configured to control a motor output of a bi-directional motor having a maximum dynamic performance, the bi-directional motor output coupled to clutch input; a mode selector module configured to receive signals representative of at least one movement parameter of the end effector, the mode selector module selecting a mode between at least the transmission mode and the bypass mode of the clutch driver based on the signals, and switching the selected mode to the bypass mode when the end effector requires assistance at a frequency beyond the maximum dynamic performance of the bi-directional motor; and a movement controller to control the clutch driver and the motor driver to selectively apply a force on the end effector based on at least one of the selected mode and on commanded movements of the end effector for the end effector to achieve the commanded movements.

Further in accordance with the embodiment, for instance, the transmission mode includes a lock mode, the clutch driver being configured to drive the MR fluid clutch apparatus in the lock mode, in which said slippage between the clutch input and the clutch output is maintained below a given threshold.

Still further in accordance with the embodiment, for instance, the transmission mode includes a controlled slippage mode, the clutch driver being configured to drive the MR fluid clutch apparatus in the controlled slippage mode in which slippage between a clutch input and the clutch output of the MR fluid clutch apparatuses varies.

Still further in accordance with the embodiment, for instance, the mode selector module receives data on the commanded movements and selects the mode according to the commanded movements and on the at least one movement parameter.

Still further in accordance with the embodiment, for instance, the clutch driver supplies current to the at least one MR fluid clutch apparatus to reduce the slippage.

Still further in accordance with the embodiment, for instance, the clutch driver supplies current to the at least one MR fluid clutch apparatus to increase the slippage.

Still further in accordance with the embodiment, for instance, the motor driver is configured to control the motor output of the bi-directional motor with a reduction mechanism coupling the bi-directional motor and the clutch input, the maximum dynamic performance being as a function of the reduction mechanism.

DESCRIPTION OF THE PREFERRED EMBODIMENTS

Figure 1:
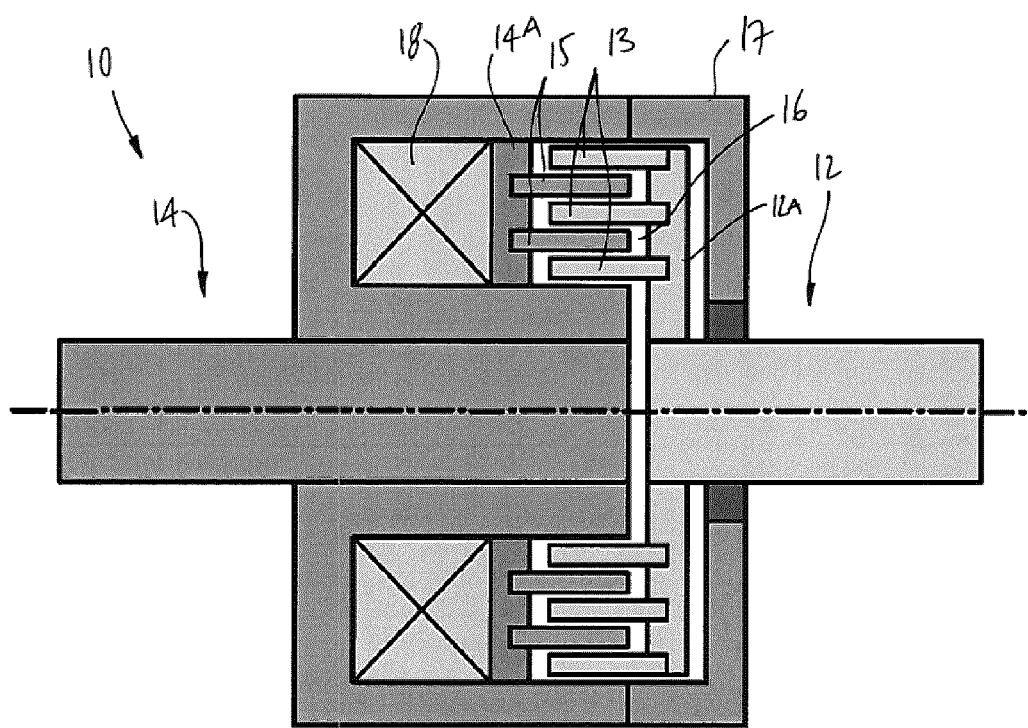
FIG. 1 is a schematic view of a MR fluid clutch apparatus used in systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as plates, redundant electromagnets, MR fluid expansion systems, etc.

The MR fluid clutch apparatus 10 has a driving member 12 with radial drums 13, this assembly also known as input rotor. The MR fluid clutch apparatus 10 also has a driven member 14 with drums 15 intertwined with the drums 13 to define one or more cylindrical chamber(s) filled with an MR fluid 16, the cylindrical chamber(s) being delimited by a casing 17 that is integral to the driven member 14. The assembly of the driven member 14 and drums 15 is also known as the output rotor. In the example of FIG. 1, the driving member 12 may be an input shaft in mechanical communication with a power input, and the driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the drums 13 on the drive side, and that of the drums 15 and of the walls of the casing 17 in the cylindrical chamber 17. The magnetic field intensity mainly affects the yield shear stress of the MR fluid. The yield shear stress of the fluid (a.k.a., the yield stress) when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 may be low enough to allow the driving member 12 to freely rotate relative to the driven member 14 and vice versa. When the torque supplied to the driving member 12 is inferior to the one the yield stress of the MR fluid 16 is able to produce, the speed of the output member 14 is the same as the input member 12 and the amount of power that the fluid has to dissipate may be reduced. In a shear situation, some torque is transmitted, but there is a relative speed between the input member 12 and the output member 14. The MR fluid allows slippage of the input member 12 relative to the output member 14, that may affect the properties of the MR fluid over time.

Figure 2A:
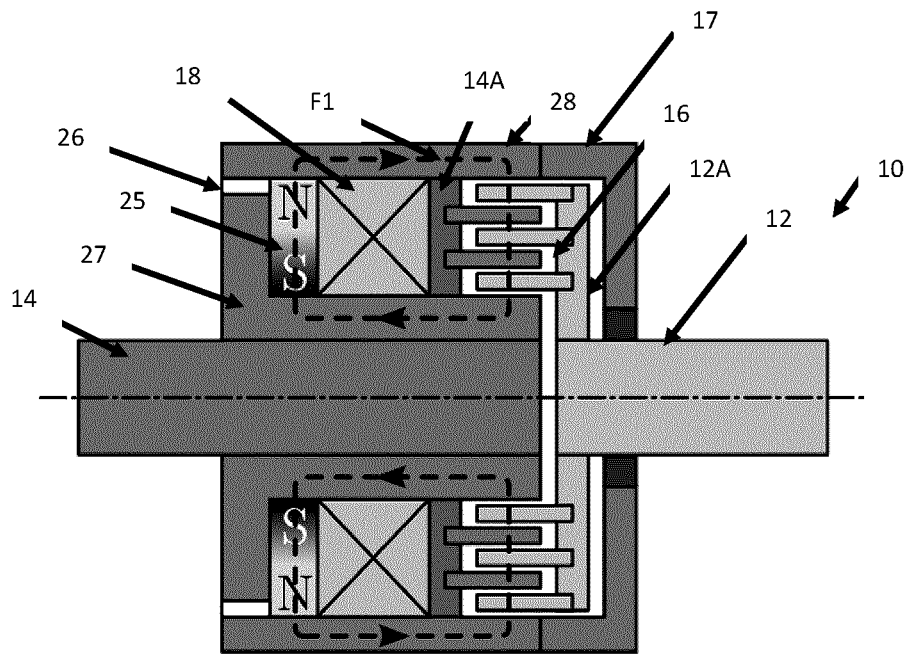
FIG. 2A is a partly sectioned view of a MR fluid clutch apparatus with a permanent magnet with a coil in an unpowered state, in accordance with the present disclosure.
Figure 2B:
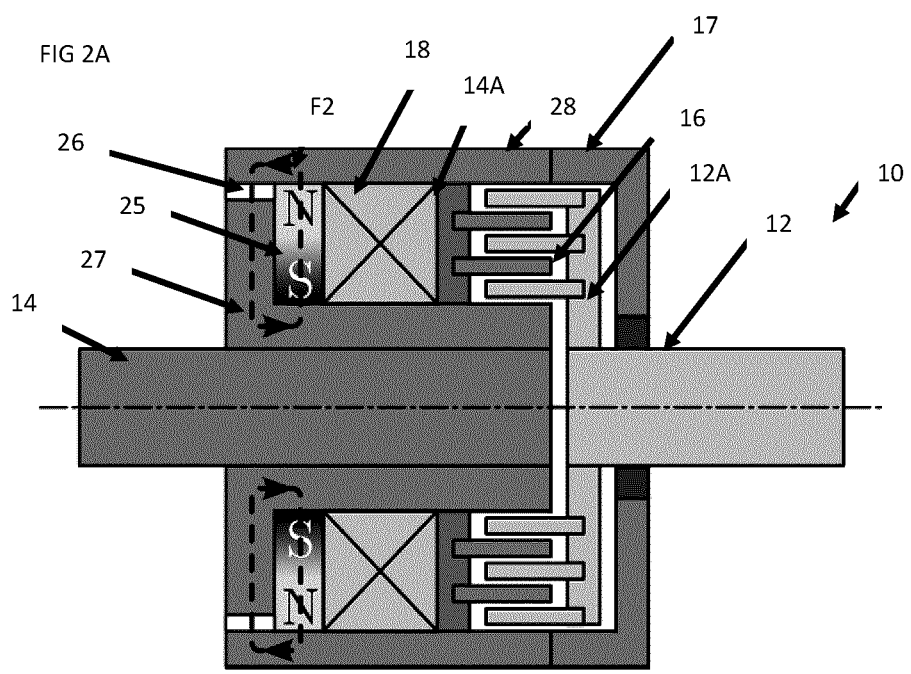
FIG. 2B is a partly sectioned view of the MR fluid clutch apparatus of FIG. 2A, with the coil in a powered state.

Referring to FIGS. 2A-2B, the MR fluid clutch apparatus 10 is shown in yet another schematic embodiment. The MR fluid clutch apparatus 10 of FIGS. 2A and 2B has numerous similar components with the MR fluid clutch apparatus 10 of FIG. 1 whereby like elements will bear like numeral references, and their description is not duplicated unnecessarily herein. A distinction lies in the presence of a permanent magnet 25 connected to the outer annular wall 28 of casing 17, in addition to the coil 18.

As shown in FIG. 2A, the permanent magnet 25 is used to generate a magnetic field F1 in the MR fluid clutch apparatus 10 so that the apparatus 10 can transfer torque without the need to apply a current via the coil 18, in contrast to the MR fluid clutch apparatus 10 of FIG. 1 in which the reduction in slippage requires an increase in current powering the coil 18. The permanent magnet 25 is radially magnetized and may be a full solid annular part or an assembly of individual magnets (such as cylindrical magnets). Gap 26, also known as a redirection gap, separates the part of the outer annular wall 28 of casing 17, i.e., the outer magnetic core, from the inner magnetic core 27.

When no current is applied to the coil 18 (power-off), as in FIG. 2A, magnetic field F1 is present in the MR fluid according to the described magnetic flux path shown. Some magnetic flux circulates in the redirection gap 26. The width of the redirection gap 26 controls the amount of magnetic flux desired in the MR fluid, a.k.a. the desired power-off torque. If the redirection gap 26 is sufficiently wide, almost all the magnetic flux induced by the permanent magnet 25 goes through the MR fluid, leading to a high power-off torque. If the redirection gap 26 is radially narrower, the magnetic flux is shared between the MR fluid and the redirection gaps 26, leading to a lower power-off torque.

Figure 2C:
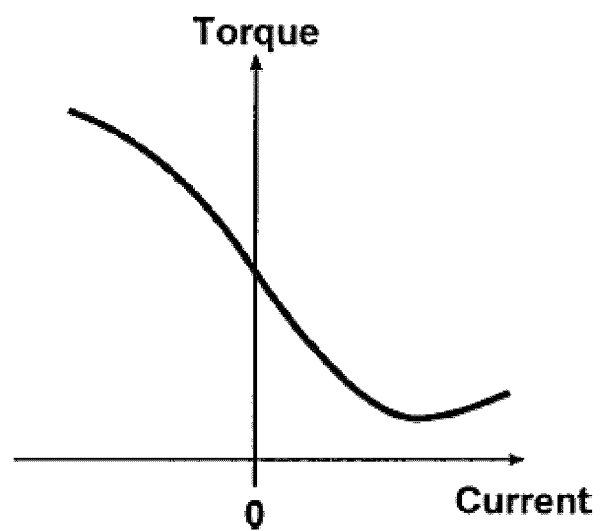
FIG. 2C is a schematic graph of torque as a function of current, for the MR fluid clutch apparatus of FIG. 2A.

As shown in FIG. 2B, when a current is applied in the coil 18 in order for the magnetic field generated to oppose to the indicated polarity of the permanent magnet 25, the magnetic flux induced by the permanent magnet 25 is redirected in the redirection gap 26 as shown by F2, which leads in a decrease of the magnetic flux in the MR fluid 16, hence a decrease of the torque transmittable by the MR fluid clutch apparatus 10 and consequently an increase in the slippage between the input member 12 and output member 14. At a given intensity of the coil current, the magnetic flux F1 in the MR fluid can nearly be cancelled or non-negligibly reduced and beyond this intensity, it will increase again (as seen in FIG. 2C). The width of the redirection radial gap 26 may also have an impact on the size of the winding of the coil 18. If the width is larger, a bigger winding is required to redirect the magnetic flux.

If the current is applied in the reverse direction, the coil 18 assists the permanent magnet 25 in the generation of magnetic flux in the MR fluid, leading to the increase of the transmittable torque of the MR clutch apparatus 10, again as shown in FIG. 2C.

Accordingly, the MR fluid clutch apparatus 10 has a normally "power-off" state of transmittable torque, because of the magnetic field induced by the permanent magnet 25. In this "power-off" state, also referred to as a lock mode, the slippage between the input member 12 and the output member 14 is below a given threshold, if not negligible or absent, for maximum rated torque transmission as long as the torque supplied on the input member 12 is below the torque transmittable by the MR fluid 16. The coil 18 is then powered to cause the MR fluid clutch apparatus 10 to vary the slippage and thus reduce torque transmission and eventually be in a controlled slippage mode. This arrangement is useful, for example when the MR fluid clutch apparatus 10 must maintain torque transmission in spite of a power outage. The magnetic field of the permanent magnet 25 would be of sufficient magnitude for the MR fluid clutch apparatus 10 to support a load without being powered. It bears mentioning that, although the lock mode is described with the use of a permanent magnet, it is contemplated to operate the lock mode with the MR fluid clutch apparatus 10 of FIG. 1 or equivalent, the coil 18 actuated to produce a magnetic field of sufficient magnitude to remove substantially or completely any slippage between the input member 12 and output member 14.

Although MR actuators systems may be composed of a single MR fluid clutch apparatus 10, there are benefits of having them working antagonistically with a biasing member or fully active and minimally composed of two MR fluid clutch apparatuses 10 getting their torque from a motor (such as an electric motor, hydraulic motor, or any other type of motor, geared or not), that operates at variable speed and thus at variable intensity. The multimode systems presented herein may use different operational modes for the MR fluid clutch apparatuses 10. One of the modes is the "Controlled Slippage Mode" (CSA), obtained when the output torque of the system is controlled by varying the torque transmitted through the MR fluid clutch apparatuses 10. For example, a multimode system may have two counter-rotating MR fluid clutch apparatuses 10. In such a case, the CSA mode has the output rotors 14 of the two MR fluid clutch apparatuses 10 turn at speeds different than that of the input rotor 12 of the clutch apparatuses 10 so slippage occurs in both MR fluid clutch apparatuses 10. In the CSA mode, the output torque may be controlled by adjusting the torque transmitted by the MR clutch apparatuses 10, by controlling the current in the electromagnets 18 as explained above. The transmitted torque of a MR fluid clutch apparatus 10 is adjusted by varying the yield stress of the MR fluid 16. The variation of the yield stress of the MR fluid 16 may be obtained by adjusting the magnetic field strength present in the MR fluid 16. The CSA mode combines the advantages of lightweight, high-speed electric geared motors, with the high dynamic performances enabled by the slippage of the MR fluid clutch apparatuses 10. When maintained in slippage, the MR fluid clutch apparatuses 10 decouple the dynamic behavior of motors from the outputs, resulting in low output inertia and high control quality since the high output inertia of the geared motors is not reflected at the system output. This may also result in increased force accuracy as the non-linear behaviors induced by the use of geared elements (e.g. cogging, gear backlash, friction) are filtered by the clutch apparatuses 10. This may also result in low mass and a reduced number of components since loads generated by the main geared motors can be shared between a plurality of outputs, and/or in some applications, high reliability as faulty geared motors can be disconnected from the output following clutch disengagement.

Another mode is a "lock mode", according to which the transmitted torque of at least one MR fluid clutch apparatus 10 corresponds to less than the yield stress of the MR fluid 16, the output of the system being controlled by varying the torque and speed generated by the motor A (e.g., shown in FIGS. 4 to 22). In lock mode, the input rotor 12 turns at substantially the same speed as that of the output rotor 14 in at least one MR fluid clutch apparatus 10. In a contemplated embodiment, a pair of the MR fluid clutch apparatus 10 is used in multimode. When high dynamic performances are required, the MR fluid clutch apparatus 10 may be used in CSA mode and when lower dynamic performances are required, the MR fluid clutches apparatus 10 may be used in lock mode. A typical application of this would be in a robot where most of the motion may be controlled in lock mode of one MR fluid clutch apparatus 10, switching to CSA mode only for limited or short periods of time when providing fine movement with high bandwidth controllability (i.e.: contact with a human or objects, haptic teaching to the robot, smoothing the acceleration or the deceleration, rapid directional changes). By using the MR fluid clutch apparatus 10 in multimode, the amount of energy dissipated in the fluid 16 may be reduced in comparison to non-multimode arrangements, hence lessening exposure of the fluid 16 to property change conditions over time.

Figure 15:
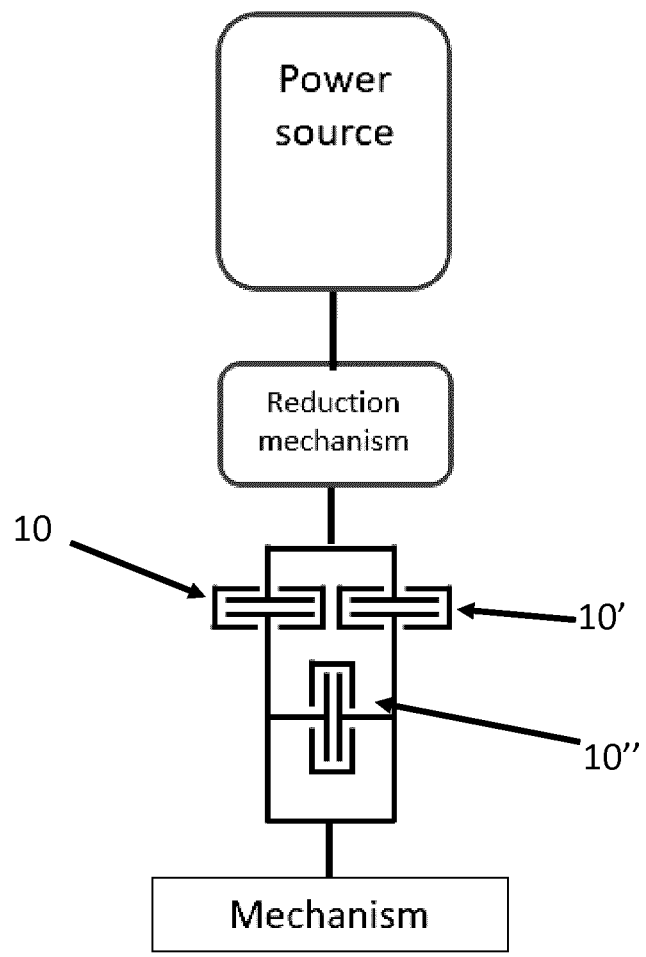
FIG. 15 is a schematic view of an MR fluid actuator unit three of the MR fluid clutch apparatuses, the MR fluid clutch apparatuses being connected to the speed reducer and turning in opposite directions and wherein an additional MR fluid clutch apparatus is connected to at least one of the output of the MR fluid clutch apparatuses.
Figure 16:
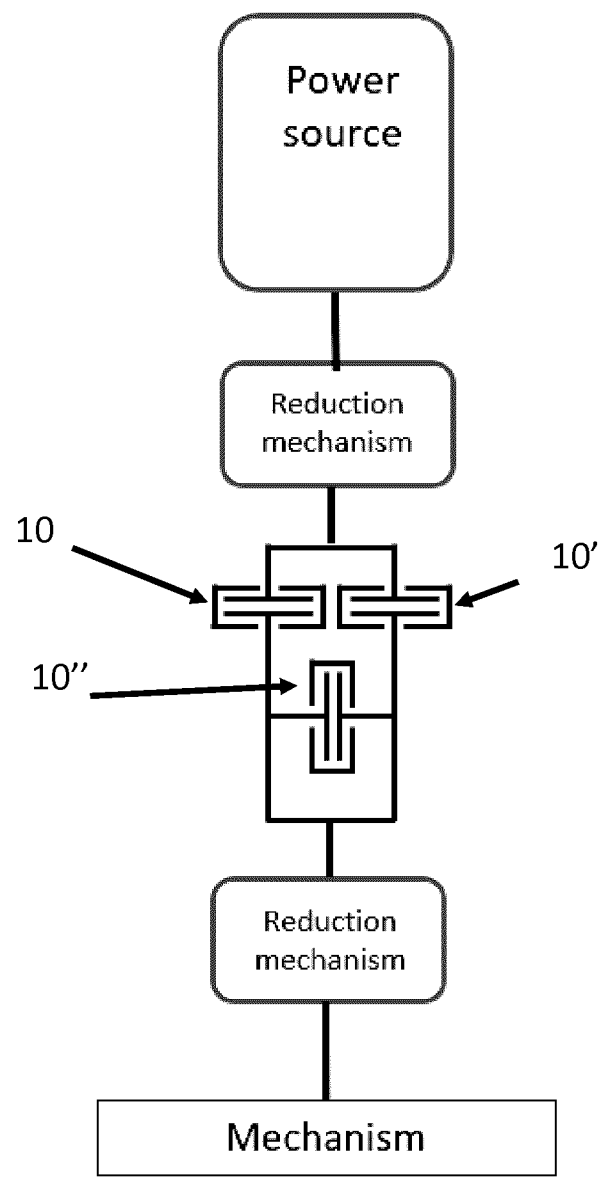
FIG. 16 is a schematic view of an MR fluid actuator unit three of the MR fluid clutch apparatuses, both MR fluid clutch apparatuses being connected to the speed reducer and turning in opposite directions and wherein an additional speed reducer is connected to the output of the MR fluid clutch apparatuses and where an additional MR fluid clutch is connected to at least one of the output of the MR fluid clutch apparatuses.
Figure 17A:
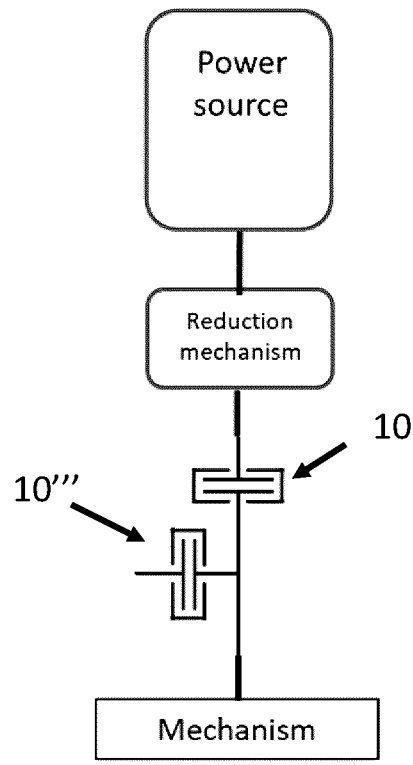
FIG. 17A is a schematic representation of an MR fluid actuator unit similar to FIG. 15 but with one MR fluid clutch apparatus connected to the power source and an additional MR fluid clutch apparatus connected to the output of the MR fluid actuator unit.
Figure 17B:
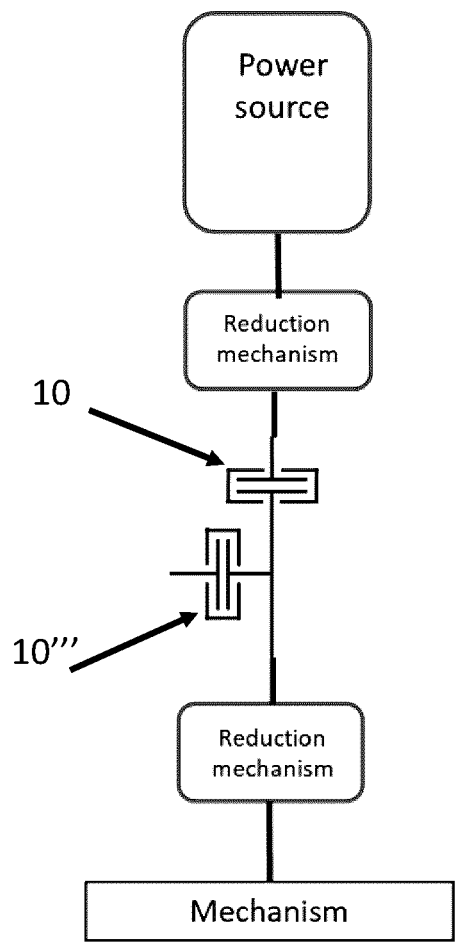
FIG. 17B is a schematic representation of an MR fluid actuator unit similar to FIG. 17A with an additional reduction mechanism.

Another mode is the "combined mode", according to which the transmitted torques of multiple MR clutch apparatuses 10 are added to act on the system in the same direction. In this "combined mode", the output rotors 14 of multiple MR fluid clutch apparatuses 10 exert a force in the same direction of the mechanical system. Hence, the combined mode may be obtained by having independent MR fluid actuator units 11 like the ones shown in FIG. 18A or FIG. 18B connected to the same mechanism but also may be achieved by having more than one MR fluid clutch apparatus 10 connected to the same power source, like in the assemblies shown in FIGS. 4-16 by combining the forces of one or more than one MR fluid clutch apparatus 10 with a MR fluid clutch apparatus 10 connected to a ground as shown in FIGS. 17A and 17B. Alternatively, the combined mode may combine the force of more than one MR fluid clutch apparatus 10 connected to a power source with a MR fluid clutch apparatus 10 connected in a shunt arrangement as shown in FIGS. 15-16.

The combined mode may not inject in the system more power than the motor is able to supply. However, the combined mode may dissipate more energy from the system than the motor can dissipate or provide. A typical use of the combined mode may be in a robot where most of the motion may be controlled in an active manner with a certain level of force or power, but with the capability of stopping the system (e.g., robot part) in a shorter time than the active system may do. By combining the output forces of multiples MR fluid clutch apparatuses 10 on a single mechanism, the dissipative force of the system may be increased for the system, such that movement of the mechanism driven by the MR fluid clutch apparatuses 10 can stop at a faster rate (i.e. close to double when two MR fluid clutch apparatuses 10 are contributing) than if a single MR fluid clutch apparatus 10 is used. It may be particularly useful when a system needs to have an higher dissipative capability than its capability in active mode. A MR fluid actuator unit may consequently switch from the CSA mode to the Combined mode when necessary. The combined mode may also be coined the braking mode, the damping mode or the dissipative mode.

In the CSA mode, all the energy flows from the MR fluid clutch apparatus 10 to the mechanism or from the mechanism to the power source, and needs to be provided or absorbed by the power source. However, in the combined mode, not all the energy that is removed from the system needs to flow to the power source. The reaction force exerted by one MR fluid clutch apparatus 10 may be used as the reaction force on a second MR fluid clutch apparatus 10. This is true for an antagonistic system where one MR fluid clutch apparatus 10 is working in an antagonistic manner with one or multiple MR fluid clutch apparatuses 10.

Stated differently, the combined mode may be achieved to combine the braking capabilities of two MR fluid clutch apparatuses 10 that usually work antagonistically. In the combined mode, the two MR fluid clutch apparatuses 10 work together in the same direction. When they are working in the same direction, the MR fluid clutch apparatuses 10 cannot inject energy in the system, whereby they may need to be decoupled from the drive of a power source, for instance by the temporary shutdown of the power source. In the combined mode, the two MR fluid clutch apparatuses 10 can only remove (damping function) energy from the system. Multimode may also be achieved by shunting the output of the two MR fluid clutch apparatuses 10 together. The damping is consequently increased as the two outputs 10 and 10' are braked relative to one another. The MR fluid clutch apparatus 10" shunts the output to double its braking force on the overall system.

Figure 3:
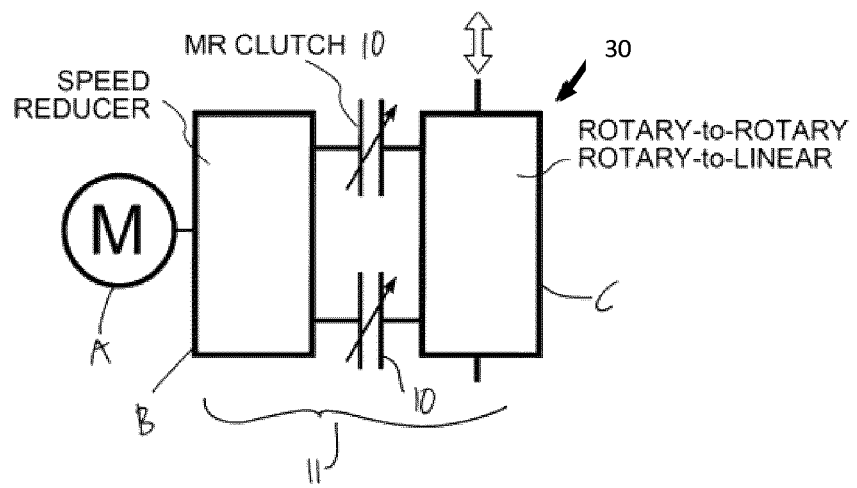
FIG. 3 is a schematic view of an MR fluid actuator unit using two of the MR fluid clutch apparatuses, the MR fluid clutch apparatuses connected to the speed reducer and turning in opposite direction.

Referring to FIG. 3, a MR fluid actuator unit 11 is generally shown as being constituted of a power source A (e.g., a motor), a speed reducer B, at least one of the MR fluid clutch apparatuses 10 and an output device C or mechanism. The output device C may be a rotary-to-rotary device, or a rotary-to-linear device. In FIG. 3, the MR fluid actuator unit 11 has two MR fluid clutch apparatuses 10 turning in opposite directions. The MR fluid actuator unit 11 may operate in the lock mode, the combined mode and the CSA mode.

Figure 4:
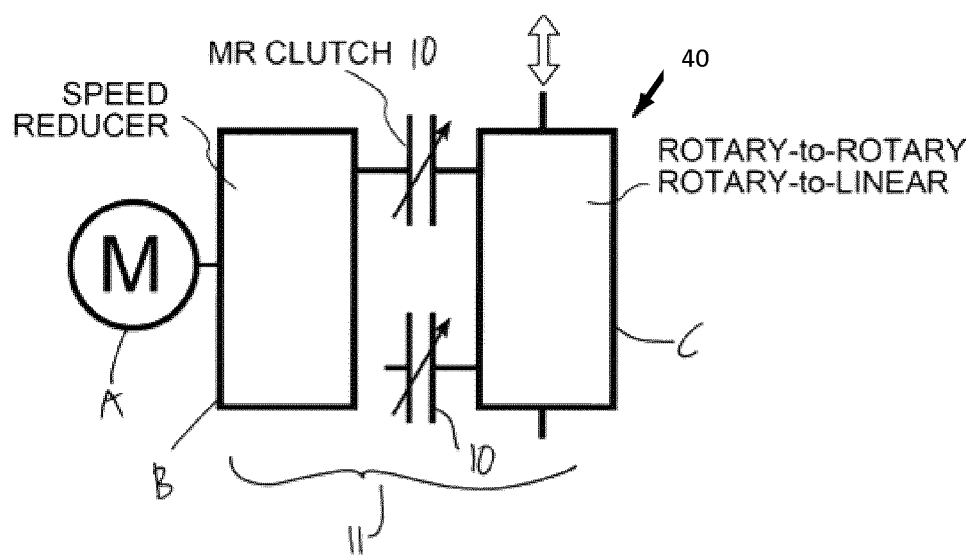
FIG. 4 is a schematic view of an MR fluid actuator unit two of the MR fluid clutch apparatuses, with one of the MR fluid clutch apparatuses connected to a fixed part and one MR fluid clutch apparatuses connected to the speed reducer.

Referring to FIG. 4, an alternative construction of MR fluid actuator unit 11 is shown at 40 where a single MR fluid clutch apparatus 10 is connected to the speed reducer and where a second MR fluid clutch apparatus 10 is connected to another component (not shown). This construction may be useful for the second clutch to reduce the effect on the output of the viscous torque generated by the first MR fluid clutch apparatus 10 that is connected to the speed reducer, increasing the controllability of the system. The MR fluid actuator unit 70 may operate in the lock mode, the combined mode and the CSA mode.

Figure 5:
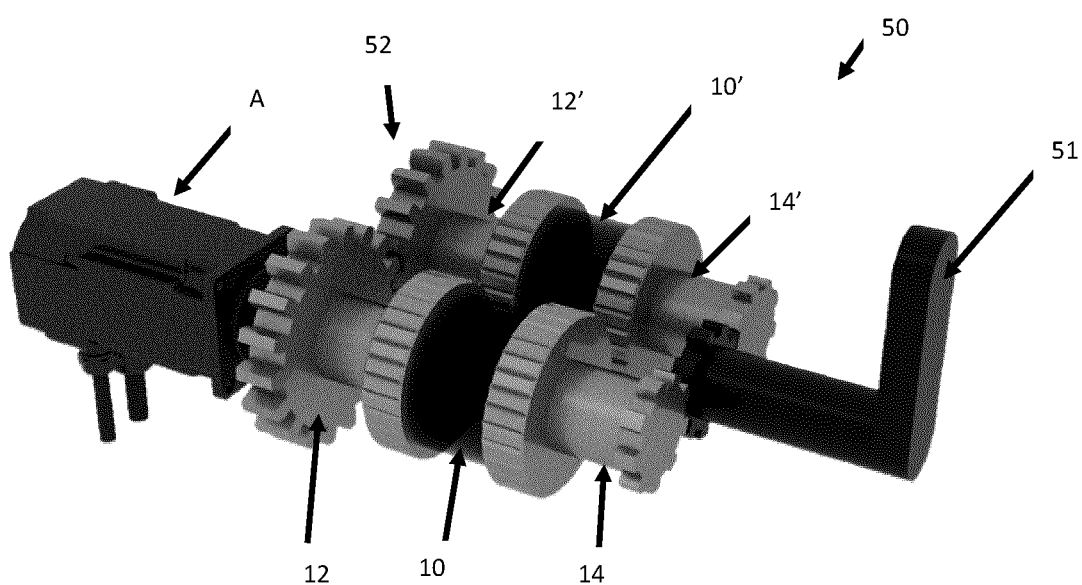
FIG. 5 is a perspective view of an active suspension system using MR fluid clutch apparatuses for a wheel assembly of a passenger vehicle.

Referring to FIG. 5, an exemplary MR fluid actuator unit 50 is shown with a rigid output link 51. The output member 51 of the MR fluid actuator unit 50 may transmit loads in two directions. In the MR fluid actuator unit 50, the clutch apparatus 10 turns in the same direction as the motor A while the clutch apparatus 10', using the rotation reversal system 52, turns in the opposite direction. When operated in lock mode, the motor A may control the position and the movement of the output link 51 by transmitting torque using only one of the two MR fluid clutch apparatuses 10,10'. The other clutch apparatus 10,10' may not transmit torque to the output link 51 in lock mode. In this operation mode, in order to make a more efficient system, one of the MR fluid clutch apparatuses 10 may stay in lock mode by the use of a permanent magnet as described in FIG. 2 and the other MR fluid clutch apparatus 10 may stay in CSA mode and may be of the type of FIG. 1. In the MR fluid actuator unit 50, the direction of the output link 51 may be controlled by the direction of rotation of the motor A or the MR fluid clutch apparatus 10 that is in lock mode. For example, in order to have the output link 51 turn in the clockwise (CW) direction, the motor A may turn CW and the MR fluid clutch apparatus 10, turning in the same direction, may be used in lock mode, while the MR fluid clutch apparatus 10' turning in the other direction (CCW) may be used in open mode (i.e., CSA mode). Alternatively, the motor A may turn CCW and the MR fluid clutch apparatus 10, turning CCW, may be used in open mode (i.e., CSA mode), while the MR fluid clutch apparatus 10' turning in the opposite direction (CW) may be used in lock mode, for the output link 51 to turn CW. When operated in CSA mode, the output link 51 may move in opposite directions by controlling the slippage in both MR fluid clutch apparatuses 10, such as in a reciprocating manner. Control may be obtained similarly to the system 30 of FIG. 3 with the difference that the CSA may be obtained with the motor A turning either CW or CCW. The benefit of working in lock mode may be lower dissipated energy in the MR fluid 16 while decreasing the dynamics performance of the actuator unit 50 in selected instances. The benefit of working in CSA mode is a better dynamic performance of the actuator unit 50. The combination of both modes lessens the exposure of the MR fluid clutch apparatuses 10 to property changing conditions, in comparison to operation in CSA mode only. When operating in combined mode, the system may dissipate energy in one or in both MR fluid clutch apparatuses 10. By combining the capacity of multiple MR fluid clutch apparatuses 10 and 10', the effective force on the output link 51 is the addition of the capacity of MR fluid clutch apparatuses 10 and 10'. In CSA mode, it is not possible to add the capacity of the MR fluid clutch apparatuses 10 but it is possible to combine them in combined mode where the MR fluid actuator unit 50 is removing energy from the system.

Figure 6:
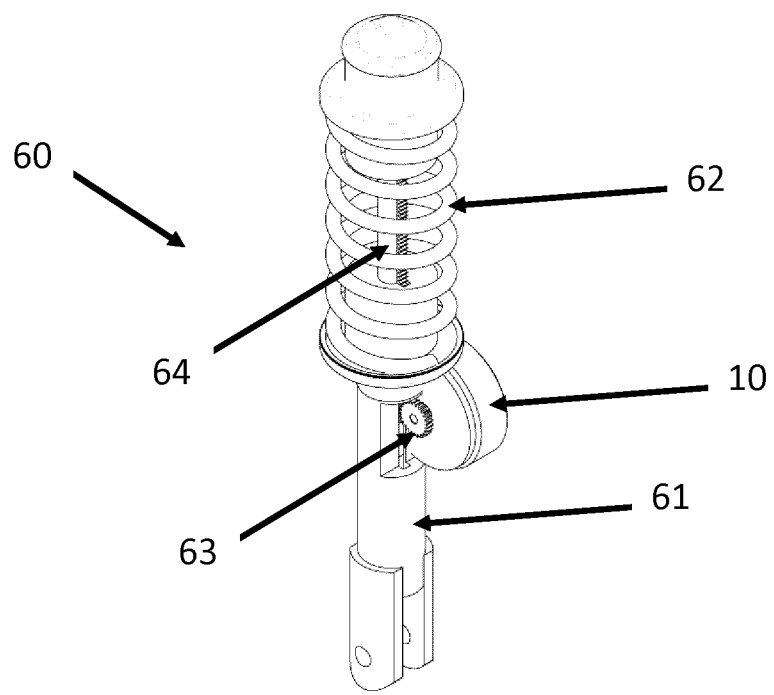
FIG. 6 is a perspective view of a pair of MR fluid clutch apparatuses acting on a structural link of a body assembly.

According to FIGS. 6, 7, 8 and 9, the active suspension system may include subsystems 60 for each wheel assembly. In the subsystem 60 of FIGS. 6 and 7, movements of a structural link 61, coupled to the wheel assembly to define a relative rotation center, is coupled to a sprung body, for instance by way of a pivot and accessories such as spring 62 and rack 64. A standard steel spring 62 is illustrated but other types of springs may be used (e.g., air spring, torsion spring, biasing member or other type of springs). In FIG. 6, a single MR fluid clutch apparatus 10 is used, with a pinion 63 as its output. The pinion 63 may be on the structural link 61, acting as an MR brake by providing braking of the movement of the structural link 61 in the unbiased direction by applying a force on rack portion 64.

In FIG. 6, the system is composed of a single MR fluid apparatus 10 that is powered by a power source (not shown), such as a motor to which the MR fluid clutch apparatus 10 is connected. A rack and pinion is shown but other rotary to linear conversion mechanism may be used (e.g., ball screw, cable, only to name a few). The active control of the system may work in lock mode most of the time, though the system may also operate in CSA mode. The CSA mode and the lock mode can be regarded as transmission modes as the MR fluid clutch apparatus 10 transmits non-negligible torque from its input to its output in these modes, to assist or brake the movement of an end effector. This system may be limited in performance by the dynamic of the power source. For example, the motor to which the MR fluid clutch apparatus 10 is connected may be a bidirectional motor (e.g., with a reduction mechanism) having a limited dynamic performance (e.g., in an embodiment, defined by a maximum frequency of operation). In some condition where the dynamic of the system would benefit from decoupling from the dynamic of the power source (i.e. motor and reduction mechanism if present), the MR fluid clutch apparatus 10 may switch to CSA mode for a period of time, if the system is mostly in lock mode to rely on the reactiveness of the bidirectional motor to which the MR fluid clutch apparatus 10 is connected. The MR fluid clutch apparatus 10 may be used to increase the transparency of the system. Indeed, in some instances, the required output exceeds the dynamic performance of the motor (e.g., with a reduction mechanism), whereby the MR fluid clutch apparatus 10 may be switched to a bypass mode, in which the MR fluid clutch apparatus 10 is in high or maximum slippage, temporarily, for the motor/reduction mechanism of the MR actuator unit to be decoupled from the structural link 61, and thus not interfere temporarily with the action of the sprig 62, or such arrangement, including a parallel mechanism featuring the spring 62 and a damper. Increasing the transparency of the system may lead to the fact that the powertrain of the MR actuator unit (i.e. motor and reduction mechanism) may not need to compensate itself (i.e. inertia, friction, cogging) and may make possible the use of a higher reduction ratio, allowing an even more compact, light, power efficient and cost effective system. This arrangement may lead to a system that has better dynamic performance than a system without a MR fluid clutch apparatus 10. This system may be less expensive than a system with multiple MR fluid clutch apparatuses 10. This system may be applied to various applications requiring a low cost dynamic motion control system for vehicle suspensions, seat suspensions, cabin suspensions, only to name few. This single clutch system of FIG. 6 may also work in CSA mode most of the time and motor reversal may be used to change the direction of the force application. The single clutch system may also be used to complement the control of a standard hydraulic damper where the active control system may act as a vehicle behavior adjuster (e.g. roll and pitch) and/or to provide active or passive localized dynamic motion control system. Because of its transparency, the system may also be used to augment force in parallel of any existing system, without compromising the dynamics of the original system.

Figure 7:
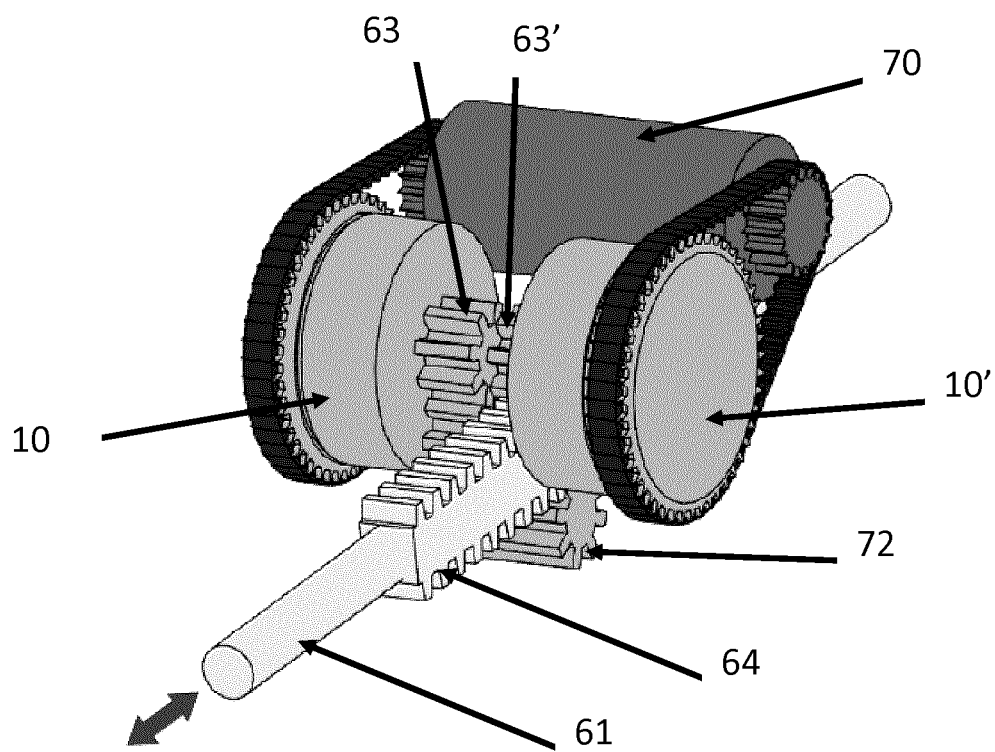
FIG. 7 is a schematic sectional view of a pair of MR fluid clutch apparatuses acting on a ballscrew of a body assembly, in accordance with one embodiment.

In FIG. 7, a pair of MR fluid clutch apparatuses 10, 10' is used, with each supporting a pinions 63, 63', on the structural link 61, defining a mechanism used to convert rotational outputs from motors 70 into back and forth translation of the rack portion 64 attached to the sprung body. The same arrangement can be used to convert back and forth translation movement of member 61 in relation to rack 64 into rotational movement of pinions 63, 63' and use MR fluid clutch apparatuses 10, 10' to transmit rotational movement to motors 70, providing a way to recuperate the energy by doing regenerative braking with the motors 70. A reactive pinion 72 may be present to take the reaction forces generated by the pinions 63, 63' on the rack 64.

In some configurations, a first structural link 51 may be coupled to the wheel assembly to define a first relative rotation center, and may be rotationally coupled to the sprung body at a first pivot, with the suspension further including a second structural link 51 coupled to the wheel assembly to define a second relative rotation center above the first relative rotation center, and rotationally coupled to the sprung body at a second pivot above the first pivot. The wheel suspension may define a geometry selected to minimize the horizontal kinetic displacement of the wheel assembly as the structural link 51 attached between any of the first or second structural and the sprung body moves through an active control range over its vertical travel.

Figure 8:
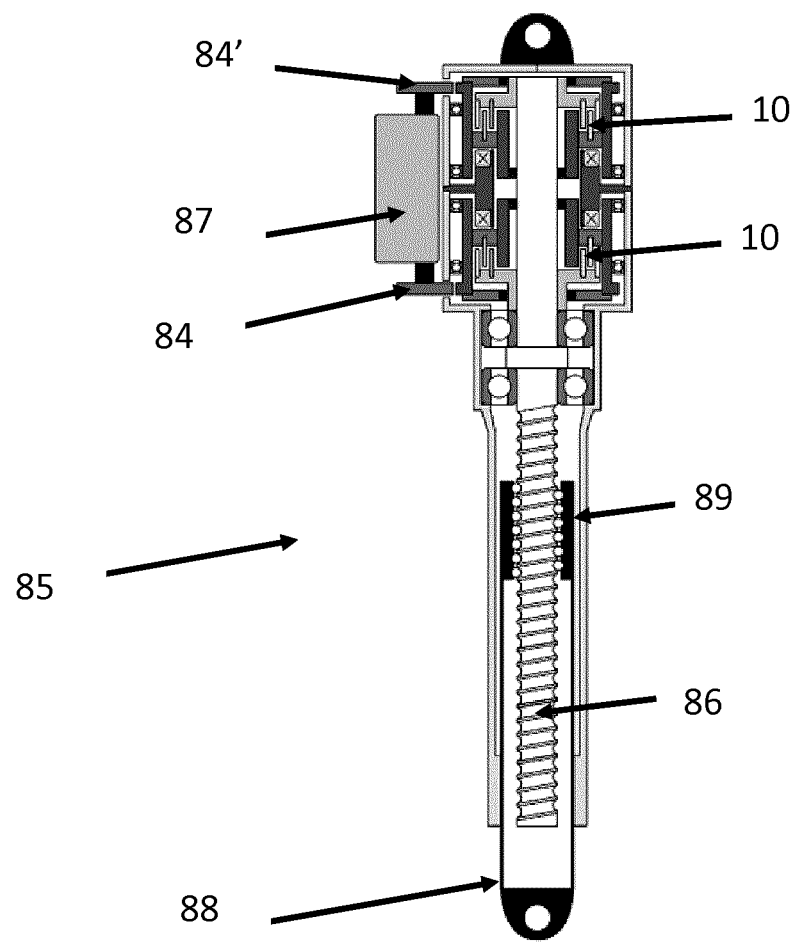
FIG. 8 is a schematic sectional view of a pair of MR fluid clutch apparatuses acting on a ballscrew of a body assembly, in accordance with another embodiment.

Referring to FIG. 8, subsystem 85 uses a pair of MR fluid clutch apparatuses 10 to control a rotation of a threaded rod 86, using the power provided by motor 87. The rotational output from the motor 87 is transmitted to the input of MR fluid clutch apparatuses 10 using mechanisms 84 and 84'. The input mechanism 84 may turn in the clockwise direction, while the input mechanism 84' may turn in the counter clockwise direction. Hence, the rotations caused by either one of the MR fluid clutch apparatuses 10 are converted by the ballscrew rod 86 into back and forth translations of the nut 89 connected to the sliding member 88. The subsystem 85 may be placed in the middle of the hollow central volume of a coil spring (as in FIG. 6) or in parallel to a strut or spring/damper system.

Figure 9:
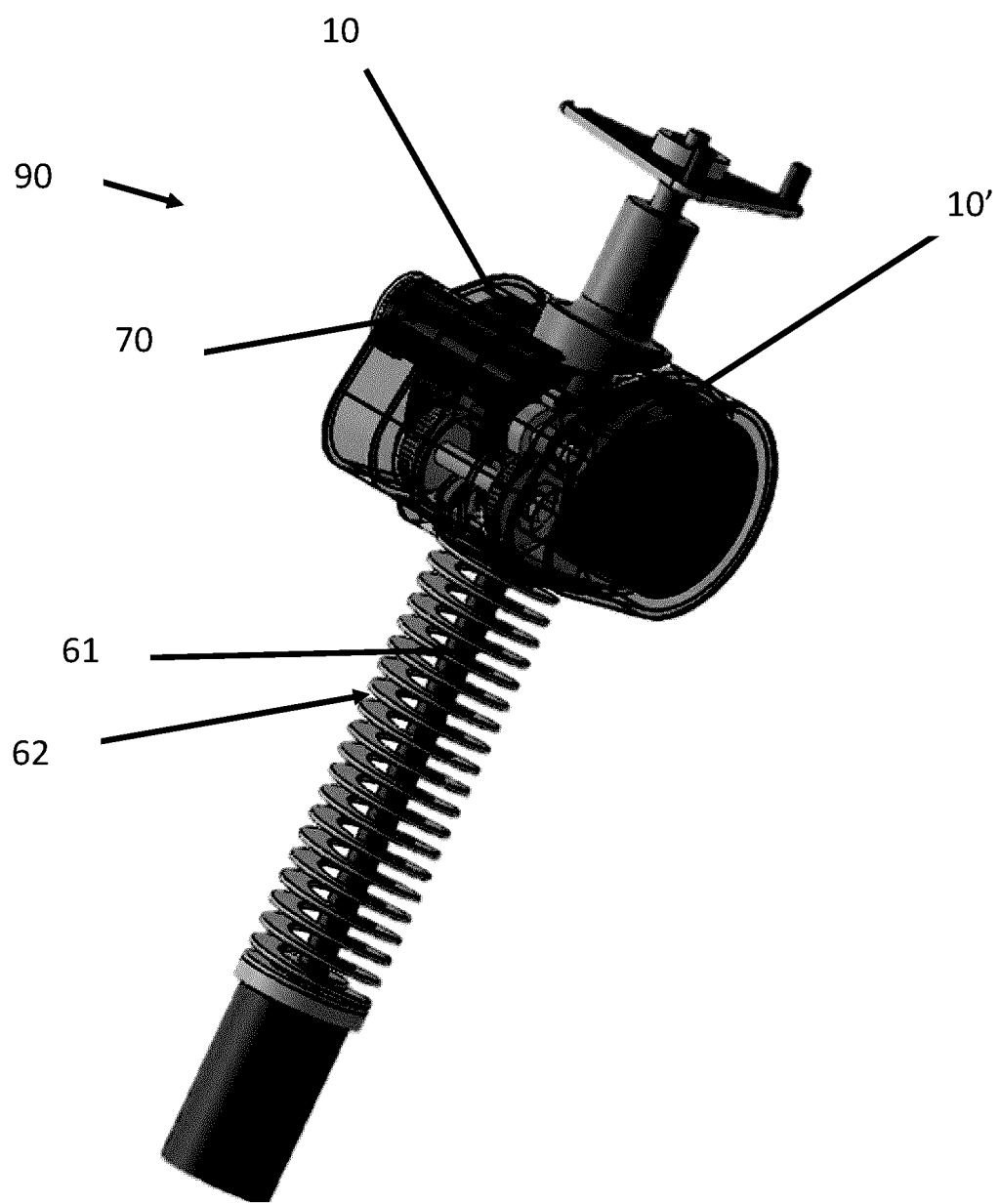
FIG. 9 is a schematic view of a pair of MR fluid clutch apparatuses acting on a rack and pinion of a body assembly where the system is organized in a strut structure.

Referring to FIG. 9, there is illustrated an alternative arrangement of the actuator shown on FIG. 7 arranged under a strut structure. This MR active strut 90 may be used to replace passive struts in applications where such a strut is already present. Such a strut 90 may be used in conjunction with a standard torsion bar or an active torsion bar as illustrated in FIGS. 10-13.

Figure 10:
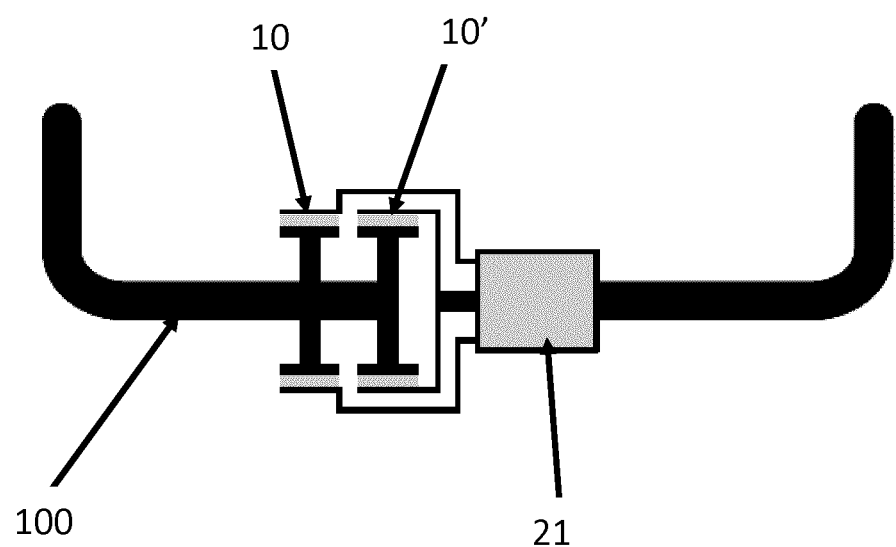
FIG. 10 is a schematic view of a roll bar with a pair of MR fluid clutch apparatuses in an active suspension system.

Referring to FIG. 10, roll bar 100 is split in two and has its ends connected using MR fluid clutch apparatuses 10, 10' whereby the action movements of the opposite wheel suspensions (i.e., at ends of the roll bar portions 100) may be fully uncoupled in an off state, so as to have negligible effect on the behavior of the wheels. In the on state, the force provided on one end of the roll bar 100 is affecting the opposite end of the roll bar 100.

Figure 11:
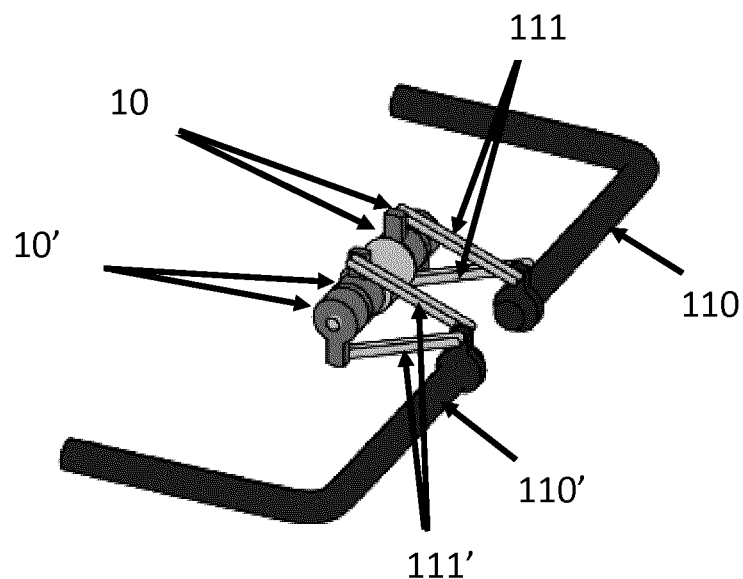
FIG. 11 is a perspective view of separated roll bar portions each operated by a pair of MR fluid clutch apparatuses and linkages in an active suspension system.

Referring to FIG. 11, two roll bar portions 110 are mechanisms connected to the chassis (or body) using an active suspension system featuring two pairs of MR fluid clutch apparatuses 10 and linkages 111 (i.e., transmission), whereby the action movements of the opposite wheel suspensions (i.e., at ends of the roll bar portions 110) may be fully uncoupled in an off state, so as to have negligible effect on the behavior of the wheels. In the on state, a minimum of elastic coupling of the spring action movements of the opposite wheel suspensions must be provided by the roll bar portions 110.

The split roll bar of FIG. 11 therefore may feature a power source 112 (e.g. an electromagnetic or hydraulic motor) connected to MR fluid clutch apparatuses 10, 10' composing the MR fluid actuator unit. The MR actuator is mounted to each of the two ends of the roll bar portions 110 forming the split hub, each controlling one wheel of the axle. Each axle is then controlled independently, with a pair of MR fluid clutch apparatuses 10 arranged in the right axle and another pair of the MR fluid clutch apparatus 10 arranged on the left axle. The result is an active suspension as controlled forces are introduced to the wheel assemblies via the roll bar portions 110, between the sprung mass of the vehicle body and its occupants, and the unsprung mass of the wheel assemblies, independently from relative position or velocity.

Figure 12:
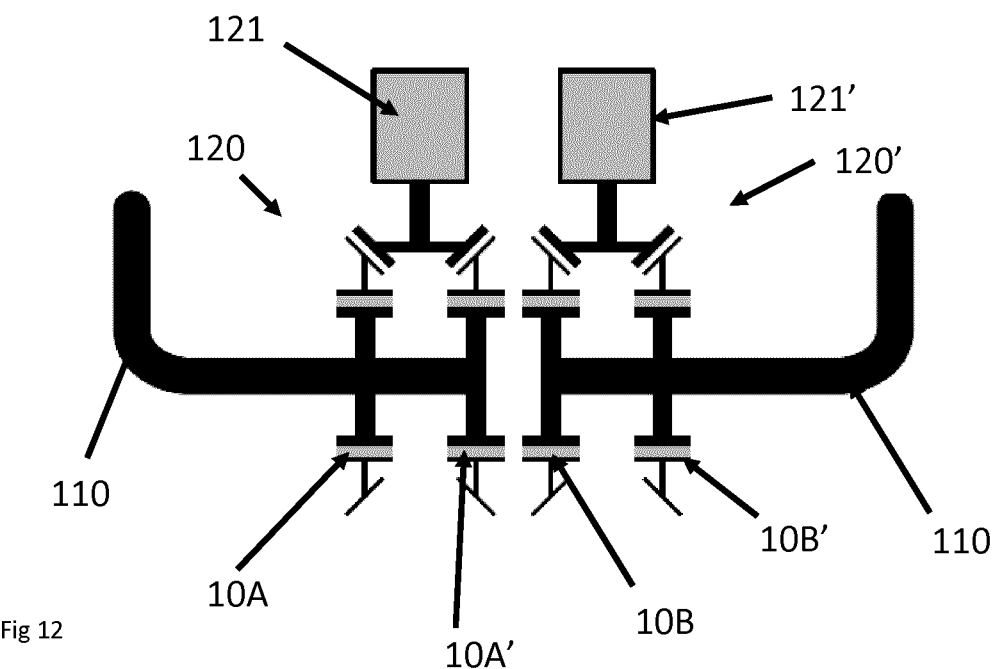
FIG. 12 is a perspective view of separated roll bar portions each operated by a pair of MR fluid clutch apparatuses and gears in an active suspension system.

Referring to FIG. 12, a similar configuration to that of FIG. 11 is illustrated, but using a gear transmission 120/120' (e.g., bevel gears) instead of linkages 111. The roll bar portions 110 are therefore controlled independently from one another, as the active suspension system features an individual motor 121 and two MR fluid clutch apparatuses 10 (i.e., 10A, 10A', 10B, 10B', concurrently, 10) for each roll bar portion 110. FIG. 12 is shown with two motors 121 but only one motor with distributed force could be used. It is important to note that the mechanical arrangement of the roll bar system may use different topology. For example, the actuator may be replaced by topologies of FIGS. 13A-18B.

In the above-described arrangements, to enhance the reliability of the roll bar, the arrangement of MR fluid clutch apparatuses 10 is used to connect the roll bar portions to one another. It is thus possible to automatically uncouple the roll bar portions from one another during a straight-line travel of the vehicle and to automatically couple them again during travel in a curve. This is done by sensors gathering the state of the vehicle, and controller appropriately controlling the MR fluid clutch apparatuses 10.

It is also considered for the clutch arrangement to connect the first roll bar portion to the second roll bar portion in such a way that they rotate in unison as a function of the actual and/or expected lateral acceleration of the vehicle. It is thus possible to automatically uncouple the roll bar during the straight-line travel of the vehicle and to automatically couple it again during travel in a curve.

A clutch arrangement of a roll bar can be embodied according to an alternative embodiment if a first roll bar portion and a second roll bar portion are connectable to one another, to rotate in unison, such that the roll bar is axially displaceable as a whole by the clutch arrangement. The clutch arrangement can be preferably controlled as a function of the velocity of the vehicle and the steering angle and/or the angular velocity of the steering wheel and/or the lateral acceleration of the vehicle, all of which may be part of the state of the vehicle obtained by sensors. To rule out a safety hazard during a possible malfunction, the clutch arrangement may have redundancy so as to remain at least partially functional in case of a defect. In another embodiment, the active suspension system with the MR fluid clutch apparatuses 10 can be installed in parallel or concentrically to a soft torsion bar and only used as a stiffness increaser. Accordingly, the active suspension system as described above is a relative cost-effective semi-active or fully active roll bar which is always sufficiently effective during travel in a curve as well as in evading maneuvers and also affects the spring action characteristics of the vehicle in order to enhance driving smoothness.

Figure 13A:
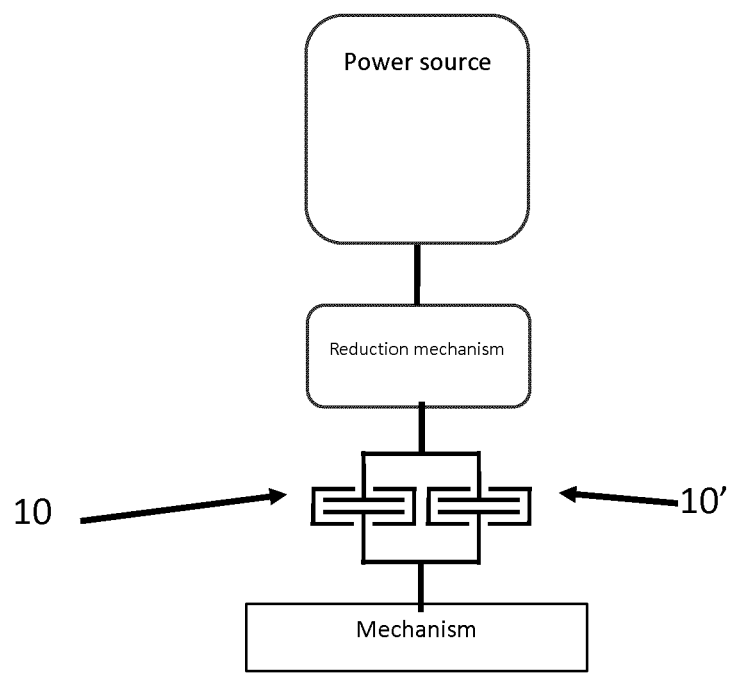
FIG. 13A is a schematic view of an MR fluid actuator unit two of the MR fluid clutch apparatuses, both MR fluid clutch apparatuses connected to the speed reducer and turning in opposite directions.
Figure 13B:
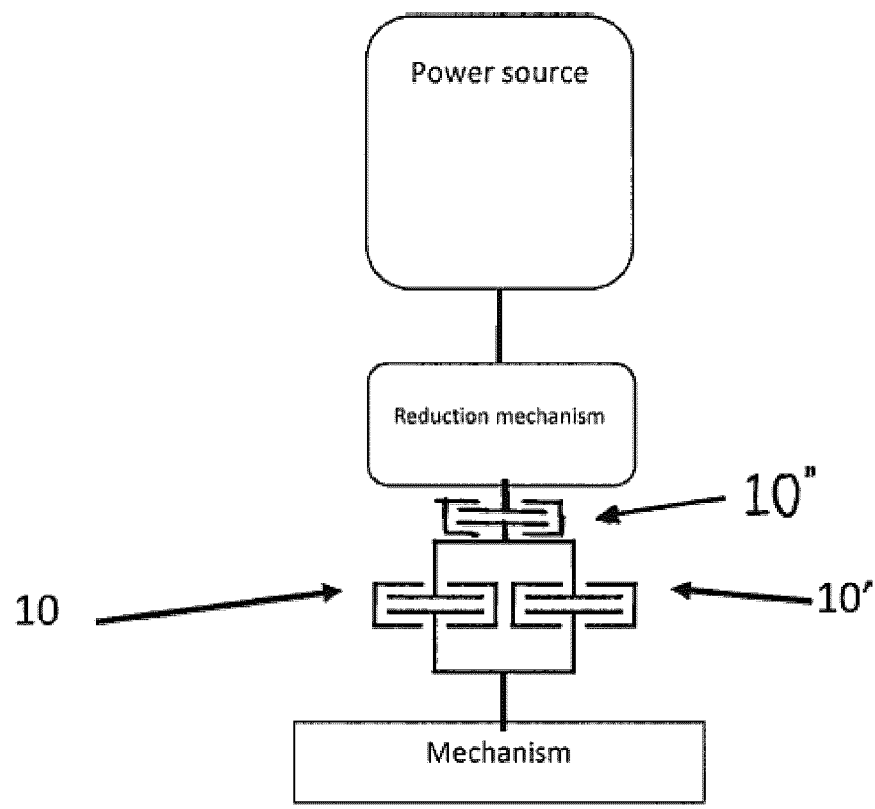
FIG. 13B is a schematic view of an MR fluid actuator unit three of the MR fluid clutch apparatuses, both MR fluid clutch apparatuses separated from the speed reducer by another MR fluid clutch apparatus and turning in opposite directions.
Figure 14:
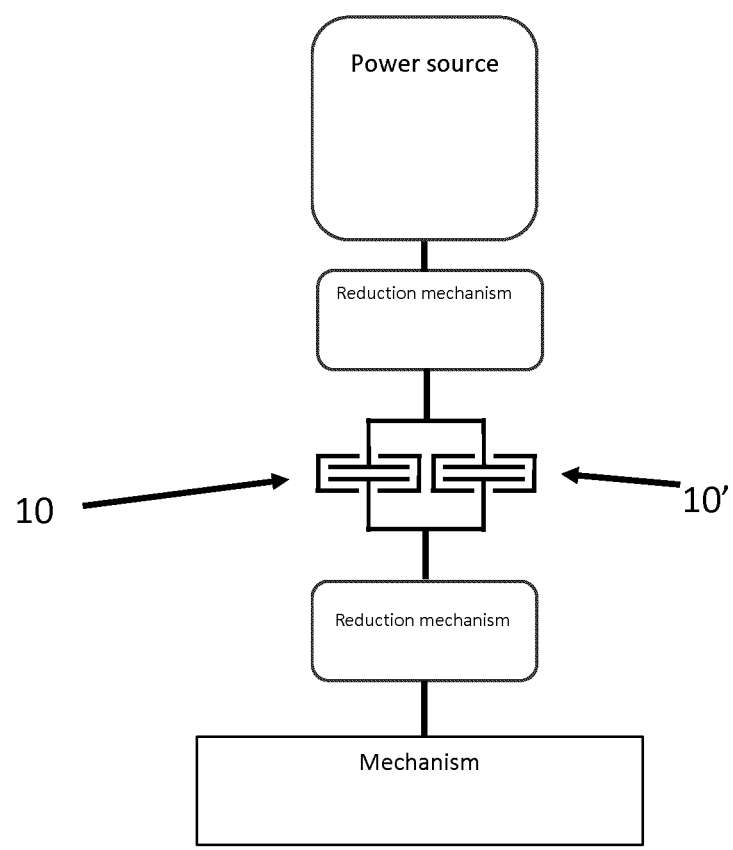
FIG. 14 is a schematic view of an MR fluid actuator unit using two of the MR fluid clutch apparatuses, both MR fluid clutch apparatuses connected to the speed reducer and turning in opposite directions and wherein an additional speed reducer is connected to the output of the MR fluid clutch apparatuses.
Figure 26:
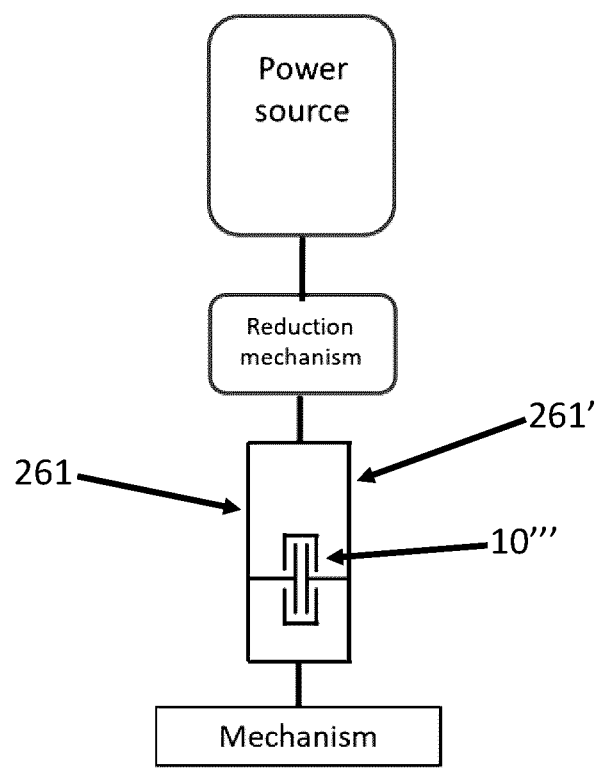
FIG. 26 is a schematic view of an MR fluid actuator unit using one MR fluid clutch apparatus of FIG. 1, where the MR fluid clutch apparatus is shunting outputs of a mechanical system that are counter-rotating.

FIGS. 13A, 13B and 14 show schematic two-port systems in which the MR fluid clutch apparatuses 10 and 10' are respectively rotating at +w and −w respectively and simultaneously. This active system may provide the fundamental advantage of having the low mass and the low inertia of any MR fluid clutch apparatus configuration while being able to work in CSA mode, lock mode or combined mode. In active suspension systems, robotics systems or other type of devices, minimizing inertia may be a way to maximize dynamic response of the system. This may be relevant not only for active MR systems like the one described but also when adding a MR fluid clutch apparatus 10 in any system, for example as shown in FIG. 26 in which a MR fluid apparatus 10 is acting like a shunt on two counter rotating shafts 261 and 261'. In FIG. 26, the system is active with a power source actuated but the MR fluid clutch apparatus 10 may also be installed on a non-actuated (passive) system. In some of the application of FIG. 26, the MR fluid clutch apparatus 10 could be added on gear motors or harmonic drives coupled to counter-rotating shafts in order to improve the performance of the dynamics response of the systems. FIG. 14 is different from FIGS. 13A and 13B because it is composed of a reduction mechanism between the output of the MR fluid clutch apparatuses 10 and 10' and the mechanism. The configuration of FIG. 14 may allow a decrease in the size of the MR fluid clutch apparatuses 10/10' for a given force but may also result in a decrease of its dynamic response. In the combined mode for the embodiment of FIG. 13A, and for subsequently described arrangements, when the system detects the need for damping or braking, the power source must stop its power injection into the MR fluid clutch apparatuses 10/10', for instance by shutting down. The MR fluid clutch apparatuses 10/10' are then activated to increase the viscosity of the MR fluid, i.e., in both MR fluid clutch apparatuses 10/10'. As the MR fluid clutch apparatuses 10/10' are coupled for antagonistic operation, a combined braking or damping effect is achieved by the MR fluid clutch apparatuses 10/10' opposing movement of one another. Accordingly, the mechanism is jammed. If the force on the mechanism (e.g., inertia) exceeds the braking force of the combined MR fluid clutch apparatuses 10/10', slippage can occur in spite of the high viscosity of the MR fluid in both MR fluid clutch apparatuses 10/10'.

The embodiment of FIG. 13B differs from the embodiment of FIG. 13A in that another MR fluid clutch apparatus 10" may uncouple the pair of MR fluid clutch apparatuses 10/10' from the power source. Accordingly, the MR fluid clutch apparatus 10" may be in lock mode, or in any other driving mode so as to provide high viscosity to the MR fluid and cause maximum or high torque transmission from the power source to the MR fluid clutch apparatuses 10/10', the latter being in any appropriate mode (e.g., lock mode or CSA mode, etc. In the event that the system must go into a combined mode, the MR fluid clutch apparatus 10" goes into a slippage mode, thereby uncoupling the power source from the MR fluid clutch apparatuses 10/10'. The MR fluid clutch apparatuses 10/10' may thus be controlled into high viscosity of MR fluid to absorb energy from the mechanism. The system may then be returned to any other mode once the step of energy dissipation has been completed, for instance by reinstating the high viscosity in the MR fluid clutch apparatus 10" and/or by operating the MR fluid clutch apparatuses 10/10' into antagonistic manner. A particularity of the arrangement of FIG. 13B is that the power source does not need to be turned off even when the system goes into combined mode. The power source may be driving other mechanisms, for instance with other MR fluid clutch apparatuses, and conveniently may remain powered throughout the combined mode of the arrangement of MR fluid clutch apparatuses 10/10'.

FIGS. 15 and 16 show the combination of FIGS. 13A, 13B and FIG. 14 coupled with the shunt system shown in FIG. 26. This system that may be composed of three MR fluid clutch apparatuses 10 (shown as 10, 10' and 10"). Braking in a third MR fluid clutch apparatus 10" rather than in a spinning clutch may provide a reduction in the energy dissipated in the MR fluid clutch apparatuses 10 and 10'. Such reduction may be desired in heavy-duty applications such as suspensions, where design life needs to be high and where consumed electrical power must be as low as possible, especially in electric vehicles. Having a third MR fluid clutch apparatus 10" may provide a second braking loop in parallel with a first braking loop consisting of the two MR fluid clutches apparatuses 10 and 10'. Having two independent control loops may allow smooth transitions from CSA mode to combined mode when shunting the MR fluid clutch apparatuses 10 and 10' that are used to provide an active control of a system (no jerks). Having a third MR fluid clutch apparatus 10" may also provide a lighter system. For example, if using only two MR fluid clutch apparatuses 10 and 10', then the total force that the two MR fluid clutch apparatuses need to be able to provide is the desired force (i.e., 2F). However, when using two MR fluid clutch apparatuses 10 and 10' and one shunt MR fluid clutch apparatus 10", then a total of MR fluid clutch apparatus force of 10 and 10' may be reduced by twice the value of the force F that the shunt MR fluid clutch apparatus 10" is able to produce. If the dissipative force in a system is more than twice the force required in the active CSA mode, there may be an advantage in adding the third MR fluid clutch apparatus 10" to optimize the weight and inertia of the system. FIG. 16 is different from FIG. 15 in that it has an additional reduction mechanism between the output of the MR fluid clutch apparatuses 10 and 10' and the mechanism. The configuration of FIG. 16 may allow a decrease in the size of the MR fluid clutch apparatuses for a given force but may also decrease its dynamic response.

FIGS. 17A and 17B show a system where a decoupling MR fluid clutch apparatus 10''' is added between the rotary output of a MR fluid actuator 11 and a fixed part. This system may present the advantage in systems where the motor has poor dynamics (e.g. a high rpm motor). The decoupling may allow efficient braking since the assembly that freely rotates has reduced inertia that is caused by the control clutch apparatus 10 decoupling the inertia of the power source and the reduction mechanism. Such reactive braking may be critical in some applications. For example, the motor may continue to spinning at its peak power/torque rpm for optimal passive to active recoveries. If the power source feeds multiple DOFs from a common shaft or a centralized active suspension, then a "decoupling clutch" may be needed to shunt a given DOF while the others remain functional.

Figures 18A, 18B:
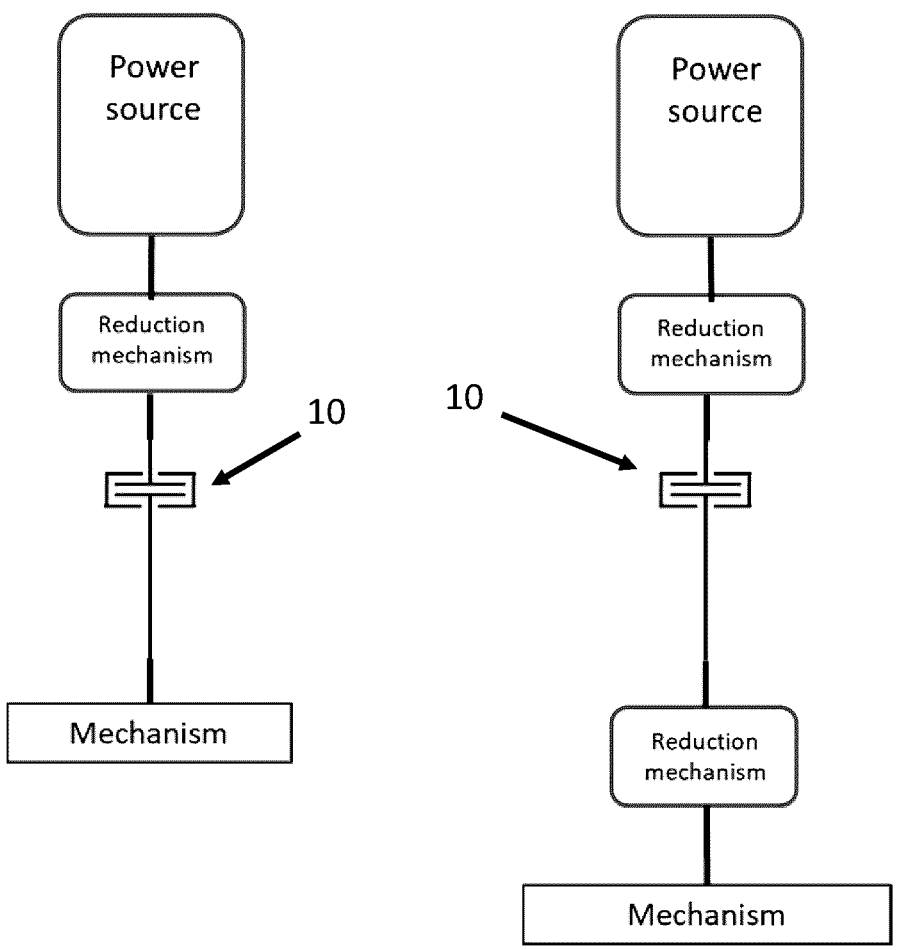
FIG. 18A is a schematic representation of an MR fluid actuator unit similar to FIG. 17A with a single MR fluid clutch is apparatus.
FIG. 18B is a schematic representation of an MR fluid actuator unit similar to FIG. 18A with an additional reduction mechanism.
Figure 19:
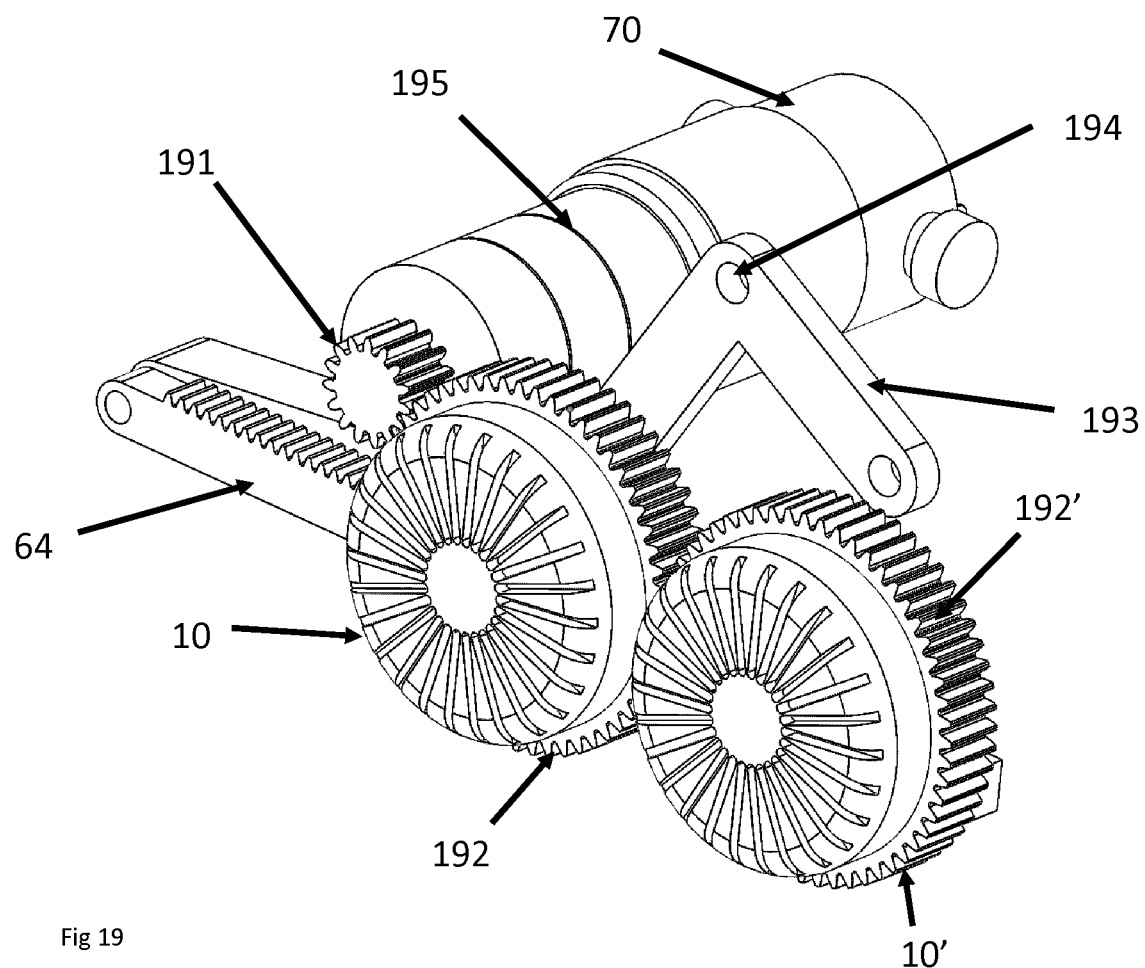
FIG. 19 is a schematic isometric view of a pair of MR fluid clutch apparatuses acting on a rack and pinion of a body assembly for lifting and lowering a structure attached to the lever.
Figure 20:
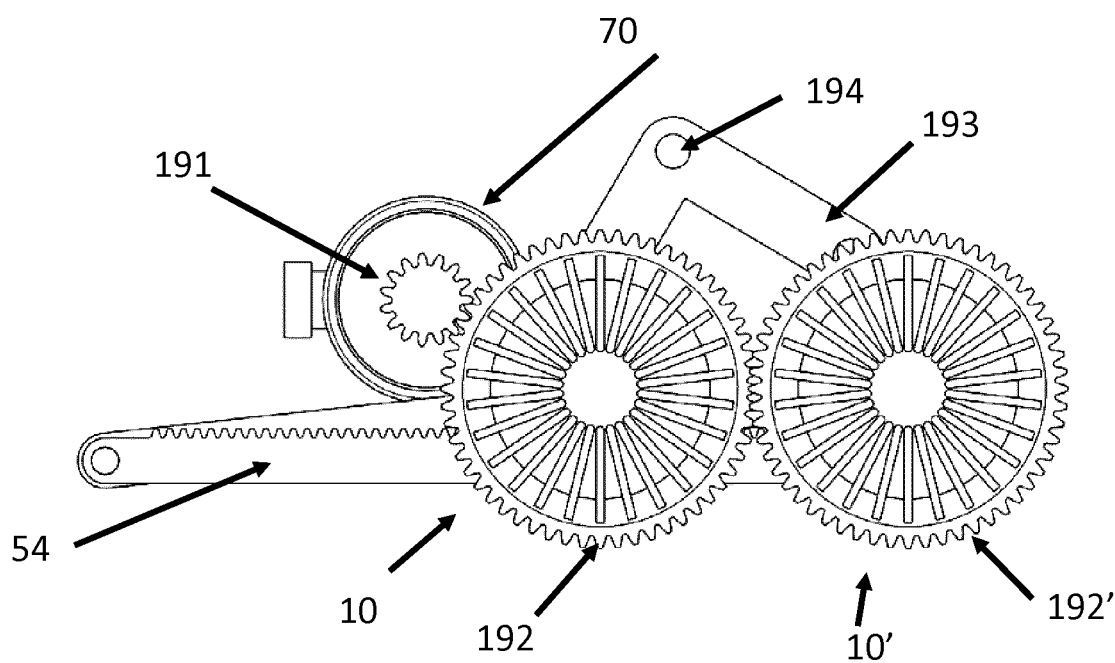
FIG. 20 is a schematic front view of the body assembly shown in FIG. 19.
Figure 21:
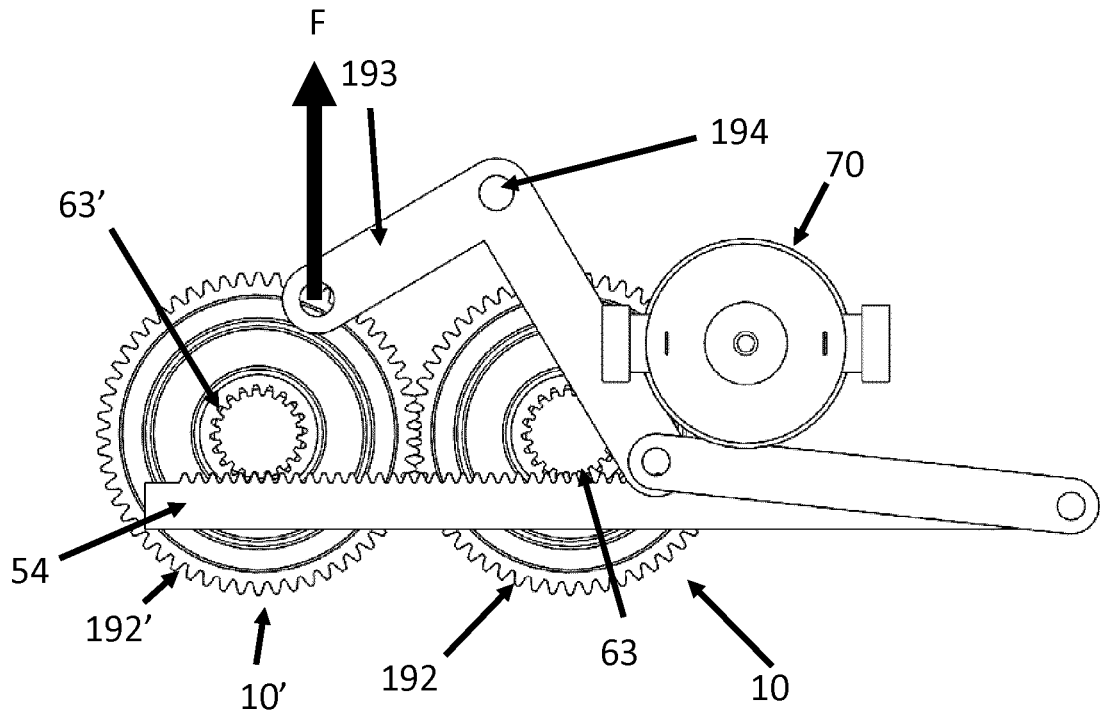
FIG. 21 is a schematic back view of the body assembly shown in FIG. 17 in a lowered position of the lever.
Figure 22:
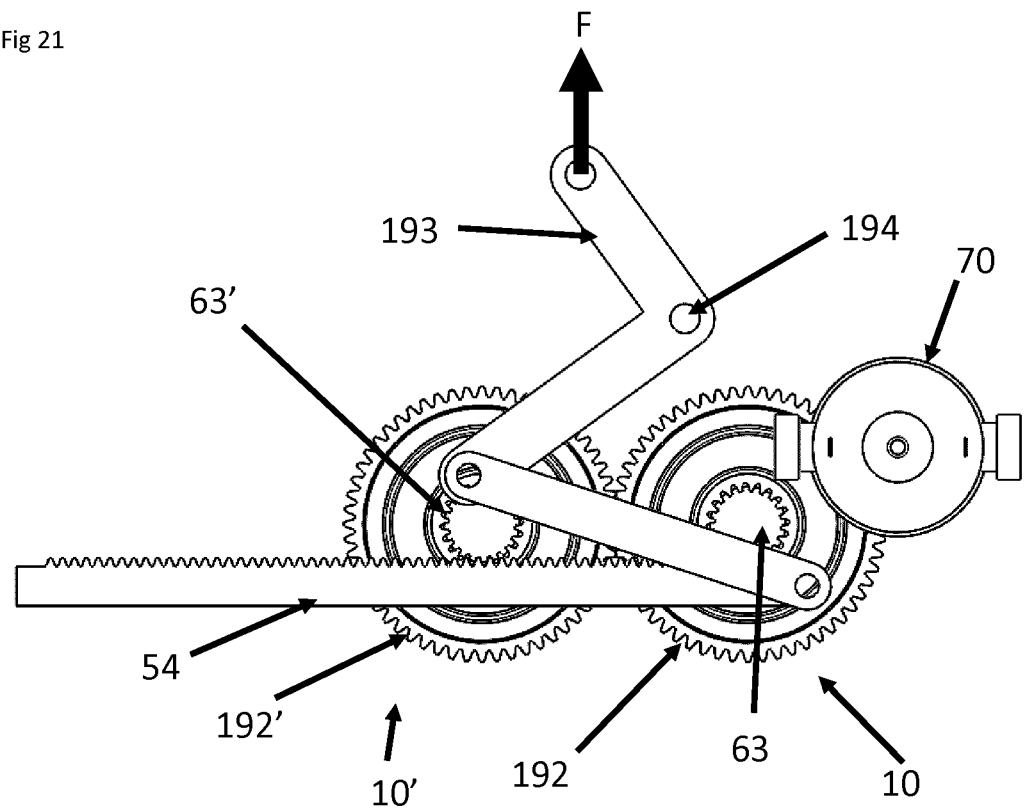
FIG. 22 is a schematic back view of the MR fluid clutch apparatus shown in FIG. 17 in a raised position of the lever.

FIGS. 18A and 18B show the schematic view of a single MR fluid clutch apparatus that may be used in active suspension systems where less performance is required, like on FIG. 6, than having a system with authority in two directions like the antagonistic systems shown in FIGS. 3-5, 7-17 and 19-22.

FIGS. 19 to 22 show a schematic isometric view of a pair of MR fluid clutch apparatuses 10,10' acting on a rack and pinion of a body assembly where the system may lift and lower a structure attached to a lever. Motor 70 optionally powers a reduction mechanism 195 that transmits rotation to a gear 191. Gear 191 is meshed to gear 192 at the input shaft (not shown) or of MR fluid clutch apparatus 10. Gear 192 is meshed to gear 192' that is at the input of MR fluid clutch apparatus 10'. On the represented view, gear 192 and 192' counter-rotate. Control of mechanism lever arm 193 with fixed pivot point 194 is done by transmitting force to the rack 54 by selectively providing torque to pinion 63 or 63' using MR fluid clutch apparatus 10 or 10' respectively, while the other of the MR fluid clutch apparatus 10 or 10' is in slippage. The system may provide high dynamic response in CSA mode as explained before. The maximum force F that the system will be able to provide in CSA or in lock mode will be equivalent to the maximum force that one MR fluid clutch apparatus 10 or 10' will be able to provide. However, the maximum force F that the system will be able to provide in combined mode will be twice the maximum force of the weakest MR fluid clutch 10 or 10'. In order to switch from the CSA mode to the combined mode, the motor 70 has to slow down to a speed where the input shaft of both the MR fluid apparatuses 10 and 10' are rotating slower than the slowest of the output shaft 14 and 14' of MR fluid apparatuses 10 and 10'. In order to achieve the combined mode, both pinions 63 and 63' have to apply force on the mechanism in the same direction. The system is working antagonistically in CSA mode but not in combined mode.

The arrangements shown in FIGS. 3, 5, 7-22 that may switch from CSA mode, optionally to lock mode and to combined mode, and hence present advantages for robotics actuator, active suspension or any other application where a dissipative force higher than an active force presents an advantage. Any of the system shown in FIGS. 3, 5, 7-22 may also incorporate one or multiple MR fluid clutch apparatuses 10 that have the topology of the MR fluid clutch apparatuses of FIGS. 2A and 2B that are partially-closed type or totally-closed type. Such systems may present the particularity of having a mode that provides some damping to the mechanism in case of partial failure of one or multiple components of the actuator or the controller. For example, if the power is interrupted to the system, the natural state of the system may be to provide a level of force that would oppose against the movement of the mechanical system, providing a level of damping. If the system has one MR fluid clutch apparatus 10, the damping would be the force generated by this MR fluid clutch apparatus. If multiple MR fluid clutch apparatuses 10 are present, then the natural level of force of the system may be increased by the MR fluid clutch apparatuses 10 going into an unpowered combined mode.

Figure 23:
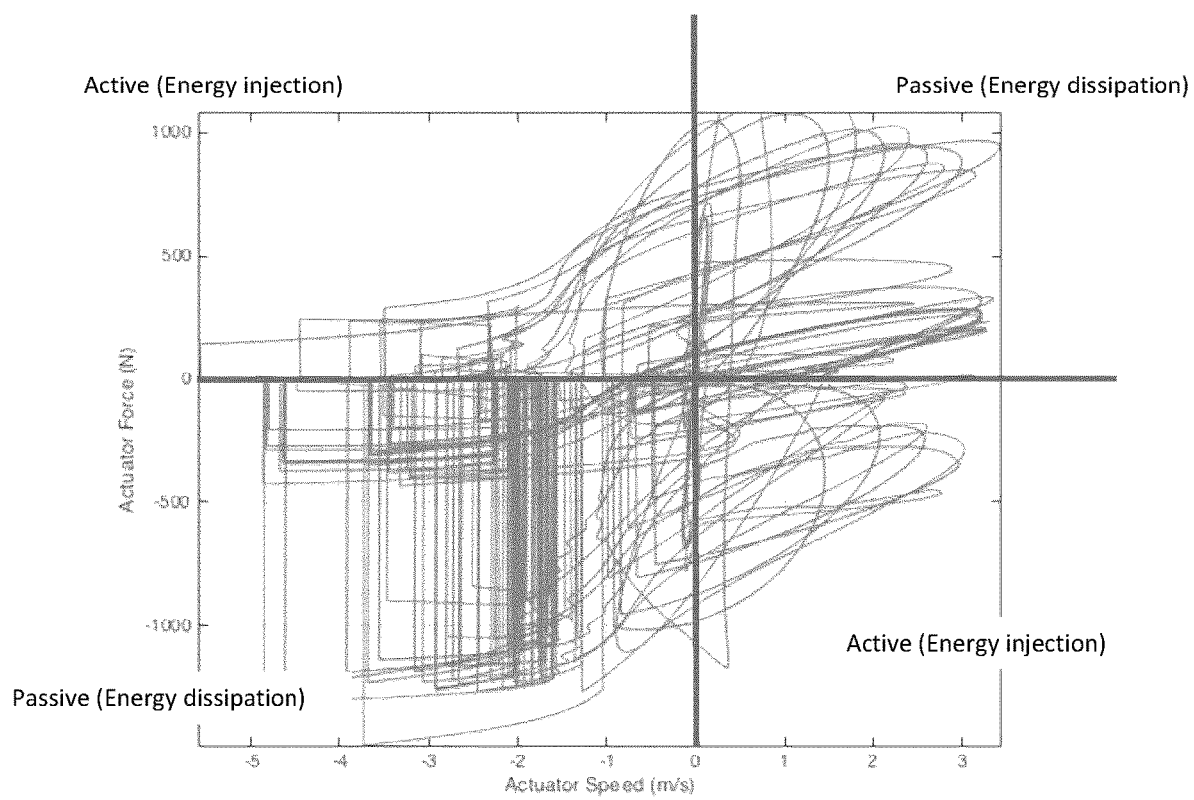
FIG. 23 is a graph of a four-operational quadrant force velocity domain for an active suspension system.

FIG. 23 is a graph showing typical forces required in an active suspension system capable of providing on demand energy flow as described herein. It is to be noted that in some of the use cases, the required active force required to be provided by the active (energy injection) suspension system is lower than the passive (dissipative) forces required. For that reason, it may be an advantage to have an active suspension system that is able to have higher dissipative capability than its ability to inject energy in the mechanism.

Figure 24:
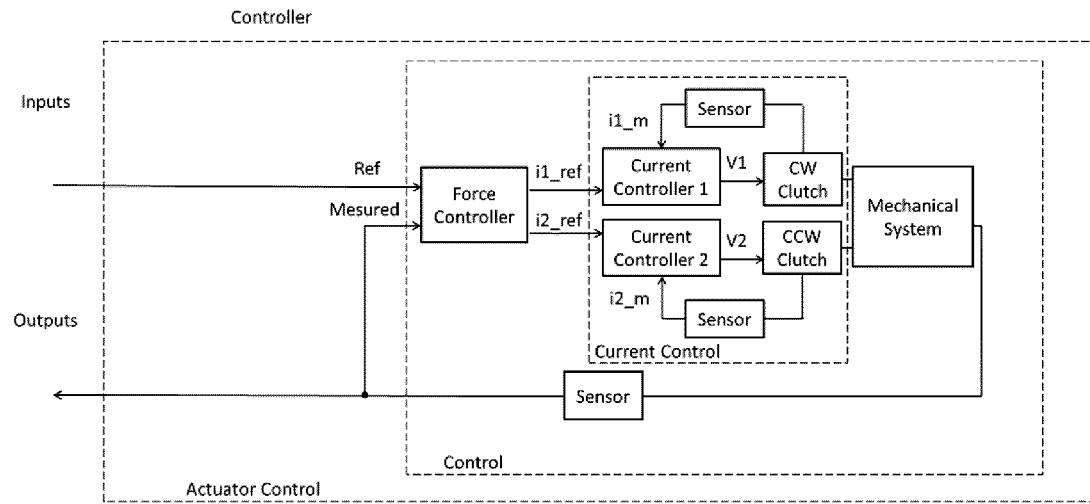
FIG. 24 is a block diagram of a control system that may be used to control some of the arrangements of MR fluid clutch apparatuses of the present disclosure.
Figure 25:
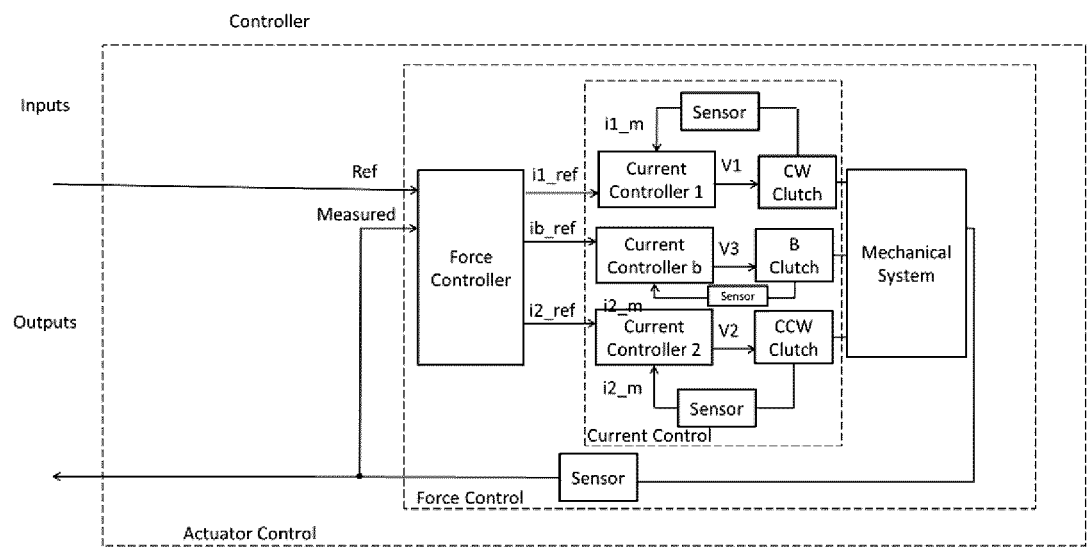
FIG. 25 is a block diagram of a control system that may be used to control some of the arrangements of MR fluid clutch apparatuses of the present disclosure in which an additional MR fluid clutch apparatus is connected to at least one of the output of the MR fluid actuator unit.

FIGS. 24 and 25 represent a controller that may be used to control the various system presented, and in particular, programmed to operate the system described herein at least in CSA mode and in combined mode. The controller may include one or more processing units, and a non-transitory computer-readable memory communicatively coupled to the processing unit and comprising computer-readable program instructions executable by the processing unit for selectively operating the systems in CSA mode, in combined mode and/or in lock mode.

Figure 27:
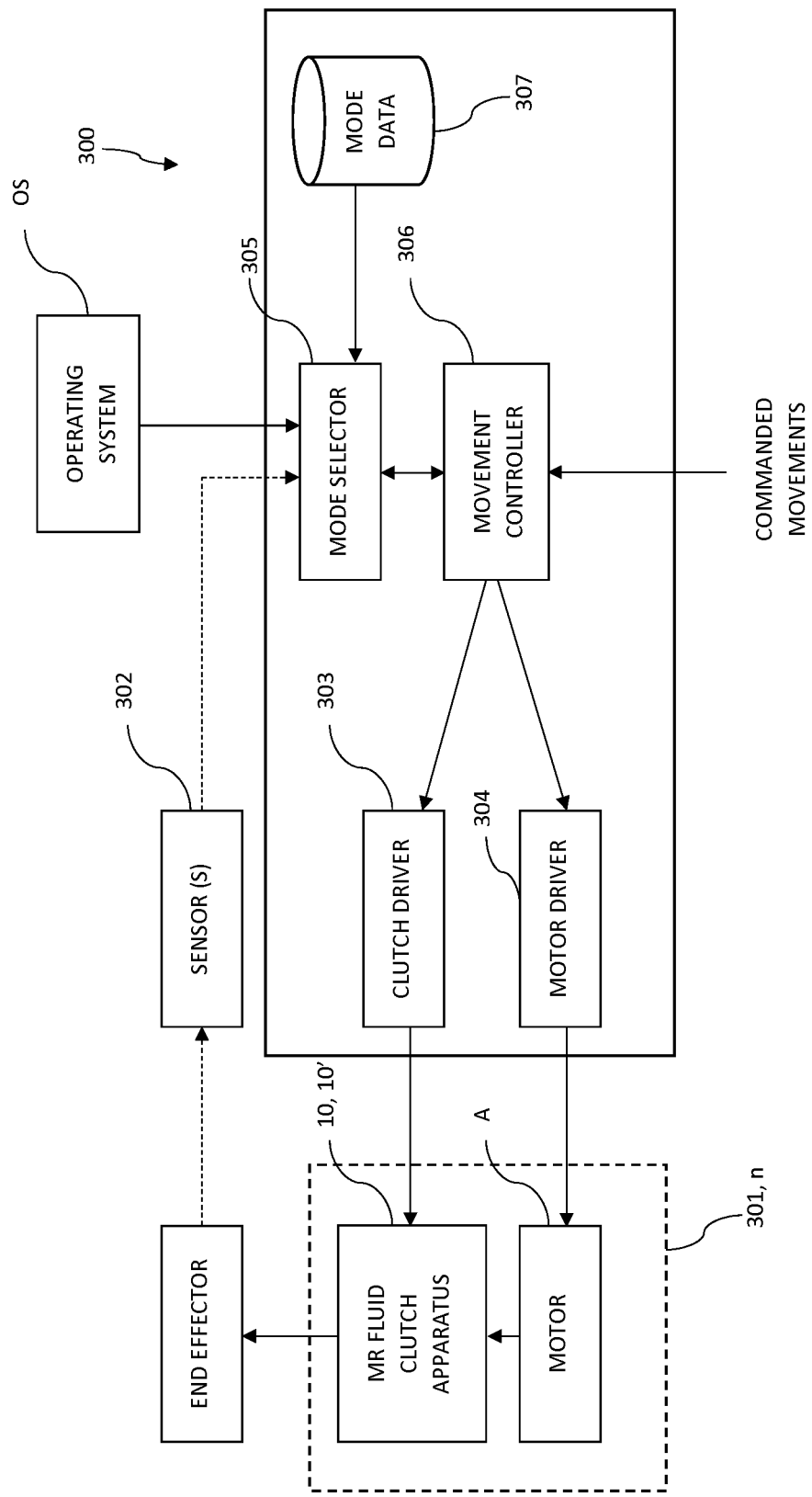
FIG. 27 is a block diagram of a control system used in an embodiment to control the arrangement of MR fluid clutch apparatuses of the present disclosure.

Referring to FIG. 27, there is illustrated a schematic of a control system 300 that may be used in conjunction with the various MR fluid actuator units to control the MR fluid actuator and determine which mode, CSA mode, combined mode or lock mode, the system may be used in, if such modes are available. The control system 300 may be in the form of a module or code programmed into the controller of FIGS. 24 and 25. In FIG. 27, the control system 300 is of the type used with at least a pair of MR fluid actuator units 301, n (n=2, 3, +) in antagonistic arrangement with a common motor A, which may be any of the MR fluid actuator units described above. For simplicity, the MR fluid actuator unit 301 is shown with MR fluid clutch apparatuses 10, n (shown as 10, 10') and motor A, although any combination is possible. The MR fluid actuator unit 301 is shown as being connected to an end effector, which may be of any appropriate kind as described above. The control system 300 may use information coming from a sensor 302 or multiple sensors in order to determine if the system should be used in CSA mode, combined mode or lock mode. The command to determine if the system should be used in CSA mode, combined mode or lock mode may also come from a user interface (not shown) or other source. The signals produced by the sensors 302 may be representative of one or more movement parameters of the end effector. For example, the movement parameters may be one or more of an external force or pressure on the end effector, a distance travelled, proximity to a boundary or to an object, acceleration, impact force, etc. The boundary may be programmed as a virtual working range of a robot, and may rely on many various types of sensors (e.g., proximity switch, inertial sensors including accelerometer, optical sensor, etc,).

Therefore, the control system 300 has a clutch driver 303 configured to drive the MR fluid clutch apparatus(es) 10 between the controlled slippage mode, the combined mode and the lock mode (if available). As detailed above, in the controlled slippage mode, slippage between the clutch input 12 and the clutch output 14 (FIG. 1) of the MR fluid clutch apparatus 10 varies and thus the torque transmitted to the end effector 31 varies as well. In the lock mode, the slippage between the clutch input 12 and the clutch output 14 (FIG. 1) is below a given threshold, if not negligible or absent. The system as a whole can also be put in a combined mode, in which pairs of MR fluid clutch apparatuses 10, n are in a high viscosity arrangement, such as in the lock mode. The clutch driver 103 controls the current sent to the electromagnet coil (e.g., 18 in FIG. 1, or FIGS. 2A and 2B) as a function of the specifications of the MR fluid clutch apparatus 10, for example the size of the gap 26, the magnetic force of the permanent magnet 25, etc, as a function of parameters of movement of the end effector that may be monitored by the sensor 302, as provided by a movement controller 306. A motor driver 304 may be configured to vary an intensity of a motor output (whether in terms of velocity or torque) of the motor A, if the motor A is not configured to operate at constant velocity or constant torque, for example (i.e., no variation). A mode selector module 305 may be configured to receive the signals from sensor(s) 302 representative of the movement parameter(s) (including force or pressure) of the end effector, or of other parts of the MR fluid actuator unit 301 or mechanism, such as the motor A (e.g., stress sensor, hydraulic pressure sensor, force sensor) or the fluid clutch apparatus 10. The mode selector module 305 selects a mode between the controlled slippage mode, the combined mode and/or the lock mode of the clutch driver 303 based on the signals, and switches the selected mode based on the signals. For instance, the system may operate the controlled slippage mode and combined mode only, with no lock mode. The mode selector module 305 may have a database 307 in which mode selection is programmed, as a function of the monitored signals. By way of example, if an external pressure beyond a first threshold is sensed at the end effector, the mode selection program may require that the control system 300 automatically go in the controlled slippage mode. By way of another example, if an external pressure is beyond a second threshold, as sensed at the end effector, the mode selection program may require that the control system 300 go to the combined mode. Based on the selection of mode, the movement controller 306 controls the clutch driver 303 and the motor driver 304 to displace or block the end effector based on the selected mode and on commanded movements of the end effector. Moreover, the combined mode selection by the mode selector 305 may cause the motor drive 304 to shut down or slow down the motor A, via the movement controller 306. In terms of commanded movements, the end effector may be part of a robot or automated system performing given tasks (such as operating system OS), in which case the control system 300 may be commanded, controlled or programmed to execute specific movements. The movement controller 306 determines the intensity (e.g., speed or torque) of the motor output in the locked mode and/or combined mode if not at constant torque or constant speed, with the MR fluid clutch apparatus 10 providing limited or negligible slippage. The movement controller 306 also determines the parameters of movements of the end effector (e.g., distance to move, acceleration, deceleration, stop, release) for the MR fluid clutch apparatus 10 to adapt the controlled slippage mode such that the end effector may achieve the commanded movements. According to an embodiment, the movement controller 306 receives the commanded movements from a user, a program, an external system, and forwards the commanded movements to the mode selector module 305 such that the mode selector module 305 selects the mode based on movements constraints of the end effector (e.g., working envelope).

The control system 300 may therefore control independently the motor driver 304 that may command motor torque or speed, and the clutch driver 303 that may control the amount of torque that the MR fluid clutch apparatuses 10 may transfer in CSA mode, combined mode and/or lock mode. An example of this may be a robot arm using a MR fluid actuator unit of the types that are proposed above. The MR fluid actuator units may work in lock mode most of the time (e.g., between 75% and 98% of the time of movement of the end effector) in order to reduce the exposure of the MR fluid to property variation conditions. The lock mode operation may be in the low controllability portion of the working envelope, for a substantial portion of the movement (e.g., between 85%-98%). In the lock mode, the speed and force of the robot arm may be proportional to the speed and the force generated by the motor. The MR fluid actuator units may be actuated in CSA mode in numerous circumstances, such as when the end effector is in the high controllability portion of the working envelope, or when the end effector must come to a stop, deceleration and/or change of direction. As another possibility, when a force sensor 302 senses that the robot arm or end effector is contacting an obstacle (i.e. human or material) or a safety brake condition has been detected, the control system 300 may be programmed to perform a rapid stop of arm movement and consequently switch the operation in CSA mode or even full slippage in order to improve the dynamic performance of the robot arm. Because the dynamic performance of the actuator unit is improved in CSA mode, the robot arm may be stopped faster than in lock mode. The faster action may be obtained by allowing slippage in the MR fluid clutch apparatus 10. The movement controller 306 determines the parameters of operation to drive the MR fluid clutch apparatus 10. If a counter-rotating MR fluid clutch apparatus 10 is present, it may provide a reversing force on the robot arm.

This action does not require to stop the motor so it may happen faster than a normal servo motor with a gearbox transmitting its full torque via a MR fluid actuator unit operating in lock mode. The combined mode may be achieved in a situation of overload, as an example among others. For example, the load on the robot arm may exceed the predetermined capacity by accident, and it is necessary to have additional braking power to prevent or limit movement of the arm. In such a case, the combined mode may be used.

The control system 300 may be operated according to a method in which it is continuously (e.g., regularly or periodically) sensing at least one movement parameter of the end effector. The control system 300 may repeatedly switch between modes, whereby the continuous sensing provides the information for dynamic operation. The mode of operation of the MR fluid clutch apparatus(es) 10 is selected based on sensed movement parameter(s) and a commanded movement. A motor output of motor A coupled to the MR fluid clutch apparatus may be varied or kept constant (e.g., constant speed, constant torque) in a first selected mode (lock mode or CSA mode), while a slippage of the MR fluid clutch apparatus is kept below a given threshold (negligible) to cause a displacement of the end effector 31 in a commanded movement. In a second selected mode (CSA mode or combined mode), the slippage of the MR fluid clutch apparatus 10 is varied beyond the given threshold to continue a displacement of the end effector in the commanded movement, for instance with adjustable slippage.

There may be numerous sensors 302 used in complementary fashion to detect different parameters. As yet another possibility, the sensors 302 include accelerometers or speed sensors, and the mode selector 105 is configured to switch to CSA mode or combined mode when the acceleration of the end effector is beyond a given acceleration or velocity/speed threshold. A user of the control system 300 may also command the control system 300 to override the automatic mode selection to perform haptic teaching in CSA mode, in which the end effector is manipulated by a user while the movements of the end effector are recorded to be replicated subsequently by automation. In haptic teaching in CSA mode, the end effector or like robot arm needs to be displaceable with low impedance in order to be easily manipulated by the user. The control system 300 may therefore communicate with an operating system OS associated to the end effector, operating system OS giving commands such as movement parameters, desired modes of operation, safety conditions, etc.

Therefore, when the end effector or like robot arm performs tasks requiring force control as opposed to position control, the control system 300 may select the CSA mode or the combined mode for maximum brake power. Such tasks may vary depending on the use of the end effector, and may include as non-exhaustive examples the manipulating of fragile objects, the actuation of a device that needs force control, such as a surface polisher, a wiping device, pressing parts together. Robots featuring the control system 300 may benefit from the use of CSA mode for instance in directional changes, as the change of direction may be done without having to change the direction of the motor, such that cheaper motors may be used instead of expensive servo motor. By way of the control system 300, a robot may perform rapid directional changes that are beyond the bandwidth of servo motors. As a result, the end effector may offer faster adjustments and more precise manipulations in the CSA mode, yet with the lock mode reducing the operation of the MR fluid clutch apparatuses 10 in slippage.

Figure 28:
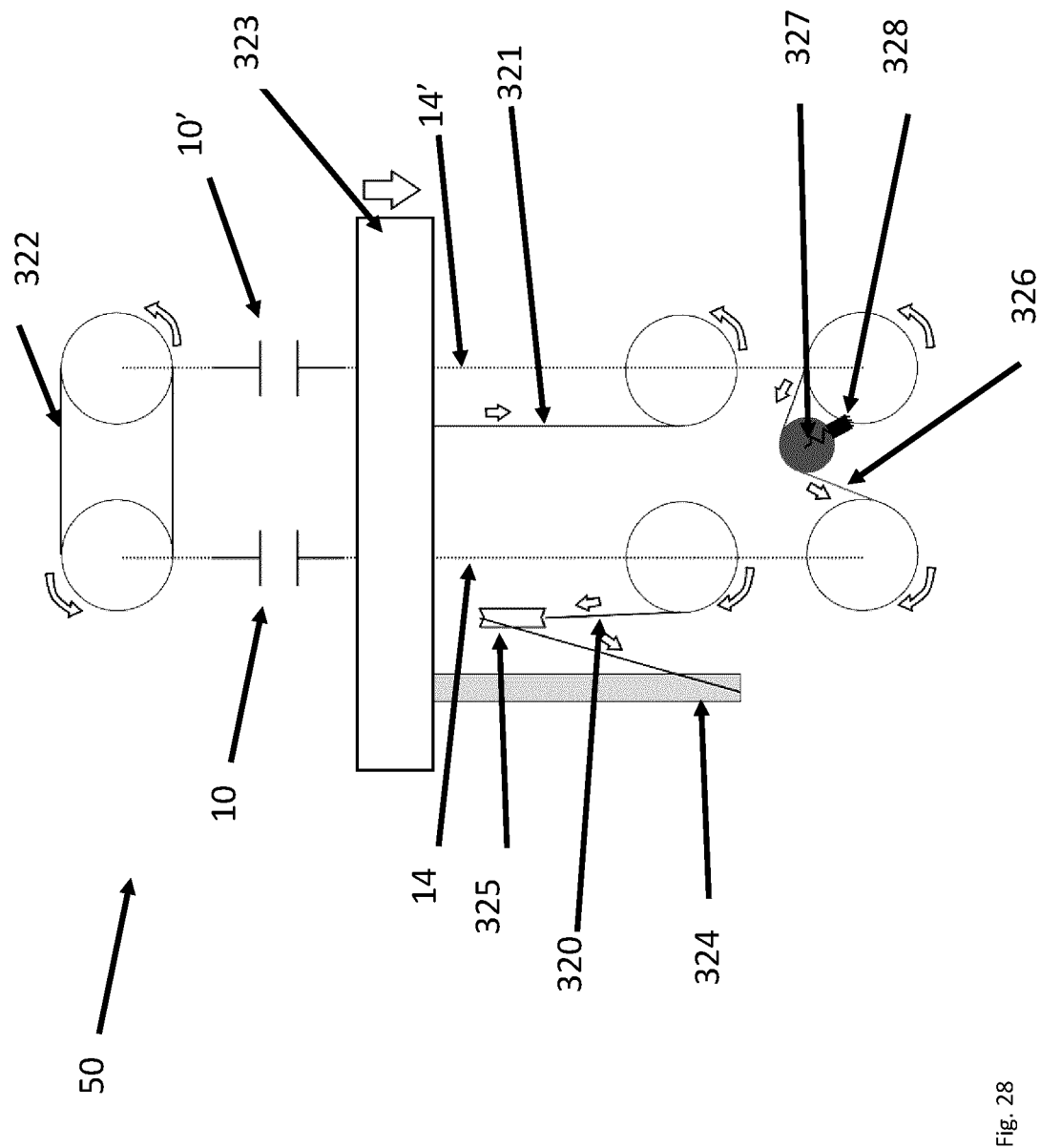
FIG. 28 is a schematic of a cable actuator where the outputs of two MR fluid clutch apparatuses are linked together by an idler and a cable in order to achieve a combined mode.

Referring to FIG. 28, another embodiment of a MR fluid actuator unit is shown at 50 with cable outputs 320 and 321. In the MR fluid actuator unit 50, the MR fluid clutch apparatus 10 turns in the same direction as the motor A (not shown) and in the same direction than the MR fluid clutch apparatus 10', using a belt 322. When operated, the motor A may turn CCW (as shown on FIG. 28) and the MR fluid clutch apparatus 10 or 10' may be operated in CSA mode, the output platform 323 may move in opposite directions by controlling the slippage in both MR fluid clutch apparatuses 10 and 10'. When actuating MR fluid clutch apparatus 10', cable 321 will pull on platform 323 downwardly in the schematic illustration of FIG. 28. When actuating MR fluid clutch apparatus 10, cable 322 will pull on platform 323 upwardly in the schematic illustration of FIG. 28 by pulling on the platform member 324 via the redirection pulley 325. In order to be able to achieve a combined mode on the cable system, a linking cable 326 may be needed to link the driven member 14 of MR fluid clutch apparatus 10 to the driven member 14' of MR fluid clutch apparatus 10'. Linking cable 326 may be routed on a cable tensioner 327 to cope with geometrical differences of the cable system. A travel of the cable tensioner 327 may be limited so when both MR fluid clutch apparatuses 10 and 10' are engaged simultaneously, the resulting effect is that both MR fluid clutches apparatuses are opposing movement of platform 323, achieving a combined braking effort. In normal operation, the motor turns at given speed (constant direction) and only one MR fluid clutch apparatus 10 or 10' is activated at a time. The tensioner 327 will maintain tension in both cables 321 and 322, coiling back the cable on the disengaged MR fluid clutch apparatus 10 or 10'. Spring 328 of the idler may compensate for the difference in length of the pull-up and pull-down cable and cable creep that may arise over time. In combined mode operation, motor A (not shown) is inactive and free to rotate and both MR fluid clutch apparatuses 10 and 10' are activated and transmit a torque value. Linking cable 326 may acts as a force summation element (puts MR fluid clutch apparatuses 10 and 10' in parallel organisation) and both MR fluid clutches apparatuses 10 and 10' are used to slow down (opposing the movement of) the platform 323.

The invention claimed is:

1. A control system for controlling movements of an end effector connected to a clutch output of at least two magnetorheological (MR) fluid clutch apparatus, the control system comprising:
   a clutch driver configured to drive the at least two MR fluid clutch apparatuses between at least a controlled slippage mode, in which slippage between a clutch input and the clutch output of the at least two MR fluid clutch apparatuses varies, and a combined mode, in which said slippage between the clutch input and the clutch output is maintained below a given threshold simultaneously for both of the MR fluid clutch apparatuses, the at least two clutch outputs resisting movement of the end effector in the same direction;
   a motor driver configured to control a motor output of at least one motor, the motor output coupled to at least one clutch input;
   a mode selector module configured to receive signals representative of at least one movement parameter of the end effector, the mode selector module selecting a mode between at least the controlled slippage mode and the combined mode of the clutch driver based on the signals, and switching the selected mode based on the signals; and
   a movement controller to control the clutch driver and the motor driver to displace the end effector based on at least one of the selected mode and on commanded movements of the end effector for the end effector to achieve the commanded movements.

2. The control system according to claim 1, wherein the mode selector module receives data on the commanded movements and selects the mode according to the commanded movements and on the at least one movement parameter.

3. The control system according to claim 1, wherein the clutch driver supplies current to the at least one of the two MR fluid clutch apparatuses to reduce the slippage.

4. The control system according to claim 1, wherein the clutch driver supplies current to the at least one of the two MR fluid clutch apparatuses to increase the slippage.

5. The control system according to claim 1, wherein the motor driver is configured to vary an intensity of a motor output of the at least one motor, and wherein the movement controller determines the intensity of the motor output in the combined mode.

6. The control system according to claim 1, wherein the mode selector module receives signals indicative of a manual contact with the end effector, and selects the controlled slippage mode throughout the manual contact.

7. The control system according to claim 1, wherein the mode selector module receives signals indicative of a position of the end effector in a working envelope thereof, and selects the mode based on the position.

8. The control system according to claim 7, wherein the mode selector module determines that the position of the end effector is in a high controllability portion of the working envelope and selects the controlled slippage mode for the high controllability portion.

9. The control system according to claim 7, wherein the mode selector module determines that the position of the end effector is in a portion of the working envelope that requires higher dissipative force and selects the combined mode for the working envelope.

10. The control system according to claim 1, wherein the mode selector module receives signals indicative of at least one of a speed and acceleration of the end effector, the mode selector module selecting the combined mode when the speed and/or acceleration is beyond a programmed threshold.

11. The control system according to claim 1, wherein the mode selector module determines from the commanded movements a change of direction of the end effector, the mode selector module selecting the combined mode for the change of direction of the end effector.

12. The control system according to claim 1, wherein the clutch driver is configured to drive at least one of the at least two MR fluid clutch apparatuses in a lock mode, in which said slippage between the clutch input and the clutch output of the at least one of the at least two MR fluid clutch apparatuses in the lock mode is maintained below a given threshold, and wherein the mode selector module selects a mode between the controlled slippage mode, the combined mode and the lock mode of the clutch driver.

13. The control system according to claim 12, wherein the mode selector module selects and maintains the lock mode for 75%-98% of an operation of the end effector.

14. An assembly of a control system and MR fluid actuator unit controlling movements of an end effector, the assembly comprising:
   the control system according to claim 1, at least one MR fluid actuator unit including the at least two MR fluid clutch apparatuses and the at least one motor, the at least two MR fluid clutch apparatuses each having the clutch output transmitting movement to the end effector, and having the clutch input coupled to the output of the at least one motor.

15. A system for controlling movements of an end effector connected to at least two magnetorheological (MR) fluid clutch apparatuses, the system comprising:
 at least one processing unit; and
 a non-transitory computer-readable memory communicatively coupled to the processing unit and comprising computer-readable program instructions executable by the processing unit for:
 continuously monitoring at least one movement parameter of the end effector;
 selecting a mode of operation of the at least two MR fluid clutch apparatuses based on at least one movement parameter and a commanded movement;
 driving a motor output of at least one motor selectively coupled to the MR fluid clutch apparatuses, while varying the slippage of the MR fluid clutch apparatuses to cause a displacement of the end effector in a commanded movement in a controlled slippage mode, and alternatively,
 maintaining the slippage of at least two of the MR fluid clutch apparatuses below a given threshold simultaneously, clutch outputs of the at least two of the MR fluid clutch apparatuses resisting movement of the end effector in the same direction, in a combined mode.

16. The system according to claim 15, wherein maintaining the slippage causes a shunting of at least one output of a mechanical system.

17. The system according to claim 15, wherein driving the motor output in the combined mode comprises shutting down the motor output.

18. The system according to claim 15, wherein varying the slippage of the MR fluid clutch apparatuses includes supplying current to at least one of the MR fluid clutch apparatuses to reduce the slippage.

19. The system according to claim 15, wherein varying the slippage of the MR fluid clutch apparatuses includes supplying current to at least one of the MR fluid clutch apparatuses to increase the slippage.

20. The system according to claim 15, further comprising keeping a slippage of at least one of the two MR fluid clutch apparatuses below a given threshold to cause a displacement of the end effector in the commanded movement in a lock mode.

* * * * *